(12) United States Patent
Tsujimoto

(10) Patent No.: US 8,681,177 B2
(45) Date of Patent: Mar. 25, 2014

(54) VIRTUAL IMAGE DISPLAY SYSTEM, INCLUDING WIRELESS CONNECTION

(75) Inventor: Takuya Tsujimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1126 days.

(21) Appl. No.: 12/257,280

(22) Filed: Oct. 23, 2008

(65) Prior Publication Data

US 2009/0109241 A1 Apr. 30, 2009

(30) Foreign Application Priority Data

Oct. 26, 2007 (JP) .................................. 2007-279383

(51) Int. Cl.
*G09G 5/00* (2006.01)
*H04B 7/212* (2006.01)
*H04W 4/00* (2009.01)
*H04W 36/00* (2009.01)
*H04W 24/00* (2009.01)

(52) U.S. Cl.
USPC ........... 345/633; 345/629; 370/321; 370/328; 455/437; 455/440; 455/456.6

(58) Field of Classification Search
USPC ........ 455/436–444, 456.6; 715/123; 370/321, 370/328; 345/629, 633
See application file for complete search history.

(56) References Cited

U.S. PATENT DOCUMENTS

| 5,805,173 | A | * | 9/1998 | Glennon et al. | ............... | 345/501 |
| 6,031,545 | A | * | 2/2000 | Ellenby et al. | ................ | 345/632 |
| 6,522,312 | B2 | | 2/2003 | Ohshima et al. | | |
| 6,876,853 | B2 | * | 4/2005 | Hokkanen | ...................... | 455/440 |
| 8,081,684 | B2 | * | 12/2011 | Lee et al. | ................. | 375/240.26 |
| 2007/0127437 | A1 | * | 6/2007 | Ozawa | .......................... | 370/352 |
| 2009/0021528 | A1 | * | 1/2009 | Liu | ............................... | 345/606 |

FOREIGN PATENT DOCUMENTS

| JP | 05-076078 A | 3/1993 |
| JP | 10-164640 A | 6/1998 |
| JP | 11-088913 A | 3/1999 |

OTHER PUBLICATIONS

Amir, Yair, "Fast handoff for Seamless Wireless Mesh Networks", Jun. 22, 2006.*
Kato, H, Billinghurst, M. "Marker Tracking and HMD Calibration for a Video-Based Augmented Reality Conference System"In Proceedings of the 2nd International Workshop on Augmented Reality (IWAR 99). Oct. 1999, San Francisco, CA, USA.

* cited by examiner

*Primary Examiner* — Aaron M Richer
*Assistant Examiner* — Robert Craddock
(74) *Attorney, Agent, or Firm* — Carter, DeLuca, Farrell & Schmidt LLP

(57) ABSTRACT

Upon receiving a communication switching instruction from a first wireless access point used for communication with an image processing apparatus, an image display apparatus disconnects communication with the first wireless access point. Simultaneously, the image display apparatus transmits, to a second wireless access point, a link request to establish communication with the second wireless access point of a new communication destination included in the switching instruction. The image display apparatus displays, on a display unit, a captured image continuously acquired from am image capturing unit until switching from the first wireless access point to the second wireless access point finishes as communication destination switching.

22 Claims, 12 Drawing Sheets

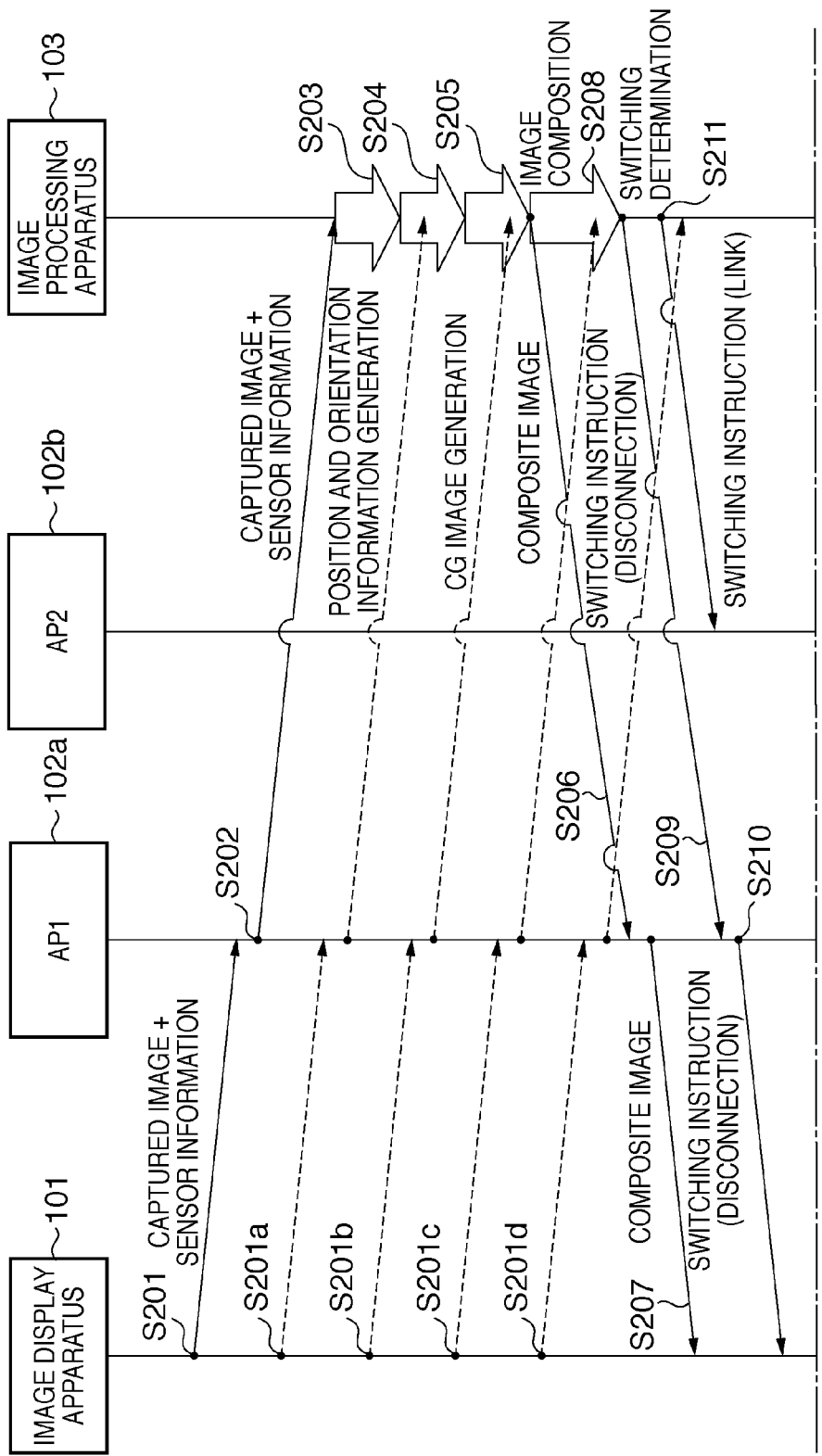

FIG. 5A

AP SWITCHING IS PROGRESSING

FIG. 5B

AP SWITCHING IS PROGRESSING.

PLEASE STAY
HERE UNTIL SWITCHING IS ENDED.

VIRTUAL IMAGE DISPLAY SYSTEM, INCLUDING WIRELESS CONNECTION

BACKGROUND OF THE INVENTION

1. Field of the Invention

The present invention relates to an image display system which causes an image display apparatus to receive an image from an image processing apparatus via a wireless access point and display the image, an image display apparatus, and a control method thereof.

2. Description of the Related Art

Recently, so-called MR (Mixed Reality) techniques are known as techniques of seamlessly combining a physical world and a virtual world in real time. A known MR technique uses a video see-through Head Mounted Display (HMD). An image capturing apparatus captures an image of an object which almost matches an object viewed from the pupil position of an HMD user. The HMD user can view an MR image obtained by superimposing a Computer Graphics (CG) image on the captured image.

FIG. 10 is a functional block diagram of a general video see-through mixed reality system which wirelessly transmits an image. An overview of the operation will be described with reference to FIG. 10.

An image display apparatus 1001 is, for example, a video see-through HMD. The image display apparatus 1001 has an image capturing unit 1004, three-dimensional position and orientation measurement sensor 1005, wireless communication I/F 1006, and display unit 1007.

The image capturing unit 1004 captures an external observation image which almost matches the line-of-sight position of the HMD user. The image capturing unit 1004 includes two sets of image capturing elements and optical systems for the right and left eyes, which generate a stereoscopic image, and a signal processing circuit, such as a Digital Signal Processing (DSP) circuit, for performing image processing of the succeeding stage.

The three-dimensional position and orientation measurement sensor 1005 measures the three-dimensional position and orientation of a measurement target to calculate the rendering position of a CG image. For example, the three-dimensional position and orientation measurement sensor 1005 acquires the three-dimensional position and orientation position (to be referred to as position and orientation information hereinafter) of the HMD user (image display apparatus 1001). The three-dimensional position and orientation measurement sensor 1005 is implemented by a magnetic sensor or a gyro sensor (acceleration and angular velocity).

The wireless communication I/F 1006 transmits or receives data to or from a wireless access point 1002a or 1002b. The wireless communication I/F 1006 transmits, for example, the image captured by the image capturing unit 1004 and the position and orientation information to the wireless access point 1002a together and receives a composited MR image. The wireless communication I/F 1006 needs to perform real-time processing and uses a high-speed wireless standard such as UWB or IEEE 802.11n capable of high-bandwidth transmission.

The display unit 1007 displays an MR image with a superimposed CG image. The display unit 1007 includes two sets of display devices and optical systems for the right and left eyes. As the display device, a small liquid crystal display or a retina scan type device utilizing MEMS is used.

Each of the wireless access points (AP) 1002a and 1002b performs information transmission with respect to the image display apparatus 1001 using wireless communication. More specifically, each of the wireless access points (AP) 1002a and 1002b transmits a display image that is a composite image with a captured image to the image display apparatus 1001, or receives output information from the three-dimensional position and orientation measurement sensor 1005 using wireless communication.

Reference numeral 1003 denotes an image processing apparatus. The image processing apparatus 1003 renders a CG image based on the captured image and the position and orientation information received from the image display apparatus 1001 and composites it with the captured image. The image processing apparatus 1003 is generally implemented by an apparatus having advanced arithmetic processing function and graphic display function, such as a personal computer or a workstation.

The image processing apparatus 1003 has a communication I/F 1008, position and orientation information generation unit 1009, CG rendering unit 1010, content storage unit 1011, and image composition unit 1012.

The communication I/F 1008 is the communication I/F on the side of the image processing apparatus 1003. The communication I/F 1008 needs to perform real-time processing and uses a metal wire such as a USB or IEEE 1394 or an optical fiber such as GigabitEthernet.

The position and orientation information generation unit 1009 generates the position and orientation information of the wearer of the image display apparatus 1001 based on the received captured image and position and orientation information. In addition to the information from the three-dimensional position and orientation measurement sensor 1005 of the image display apparatus 1001, a marker may be extracted from the captured image and used as correction information.

The CG rendering unit 1010 renders a CG image based on the position and orientation information and a content acquired from the content storage unit 1011. The content storage unit 1011 stores contents for generating a virtual image in virtual space.

The image composition unit 1012 composites the received captured image and the virtual image generated by the CG rendering unit 1010. The image composition unit 1012 transmits the obtained MR image (composite image) to the wireless access point 1002a or 1002b via the communication I/F 1008. The wireless access point 1002a or 1002b transmits the MR image to the image display apparatus 1001 by wireless communication. The MR image is thus displayed on the display unit 1007 of the image display apparatus 1001.

The above-described arrangement and processing allow any user who wears the video see-through HMD to experience a mixed reality world in which a physical world and a virtual world are seamlessly combined in real time.

Japanese Patent Application Laid-Open No. 11-88913 (FIG. 7, paragraph 0035) and Kato, H., Billinghurst, M., "Marker Tracking and HMD Calibration for a video-based Augmented Reality Conferencing System", In Proceedings of the 2nd International Workshop on Augmented Reality (IWAR 99), San Francisco, USA, October, (1999) (hereinafter, "Marker Tracking and HMD Calibration for a video-based Augmented Reality Conferencing System") disclose the arrangements of general MR techniques and systems.

The concept of position and orientation information generation using a marker will be described with reference to FIG. 11.

Referring to FIG. 11, the positional relationship between a marker 1103 and the image capturing apparatus is defined in advance. When the marker 1103 is displayed in a physical space image 1101, the position and orientation measurement unit detects the marker 1103 from the image data. It is possible to calculate the relative positional relationship between the marker 1103 and the image capturing apparatus main body and position and orientation information in the marker observation direction of the HMD user on the basis of information such as the size, shape, and fill pattern of the detected marker 1103.

FIG. 11 assumes a three-dimensional coordinate system (X axis 1105a, Y axis 1105b and Z axis 1105c) having its origin at the center of the marker 1103. However, the origin of the coordinate system need not always be set on the marker 1103. The origin of the coordinate system can be set at an arbitrary position by defining the relative positional relationship between it and the marker 1103. A plurality of markers may be used simultaneously for position and orientation information generation. To use a plurality of markers simultaneously, the positional relationship between the markers is defined in advance. This allows calculation of the marker observation direction based on the relative positional relationship between the markers.

It is therefore possible to use not the marker 1103 which has an internal fill pattern to identify the direction, as shown in FIG. 11, but, for example a color marker or a marker formed from a light-emitting element such as an LED which has no direction information but one-dimensional information. Not the marker 1103 but a feature point in the image such as an outline 1104 of a table 1102 or a specific color in the image may be extracted and used to calculate position and orientation information. It is also possible to generate more accurate position information by using a plurality of markers of the same type or a plurality of kinds of markers simultaneously, or combining marker information and the information of feature points in the image. The positional relationship between the plurality of markers or feature points is defined in advance. Hence, even when not all markers or feature points are displayed in the image, the position of each marker or feature point can be estimated.

"Marker Tracking and HMD Calibration for a video-based Augmented Reality Conferencing System" discloses implementation of an MR technique using markers.

In the system shown in FIG. 10, when the HMD user moves over a wide area, switching of a plurality of wireless access points is necessary. To allow for switching (handover) of the wireless access points, a plurality of antennas are provided on a mobile terminal itself. Before area switching, the mobile terminal establishes a link with the base station in the switching destination and then disconnects the preceding link so that it can always wirelessly communicate with any one of base stations. Japanese Patent Application Laid-Open No. 10-164640 (FIG. 1) (hereinafter, "JPLO 10-164640") discloses an example of this arrangement.

JPLO 10-164640 discloses an arrangement which performs area switching in a range where the communication range of a base station of a current link overlaps that of a base station of the new link establishment target.

Japanese Patent Application Laid-Open No. 5-76078 (hereinafter, "JPLO 5-76078") discloses a method of interpolating an unreceived image when wireless image transmission has been interrupted due to some reason.

In the arrangement disclosed in JPLO 5-76078, when infrared rays used for wireless transmission are intercepted for some reason, a signal of a still image, which is prepared in advance, is displayed.

However, the above-described prior arts have the following problems.

If an HMD having a wireless communication function moves over a wide area, the time required for handover is nonnegligible for the HMD user. Hence, images are interrupted until the completion of handover, that is, the time from disconnection of a link to establishment of a new link, or during the time from establishment of a new link to reception of a display image.

In the arrangement for always keeping at least one link established by switching a plurality of antennas, the mobile terminal must have a plurality of antennas and a plurality of circuits for communication. This leads to a bulky apparatus arrangement or circuit scale. Additionally, since a plurality of link states occur simultaneously, band assignment for communication is necessary. This limits the usable band in the whole space and limits the number of HMDs that use a single wireless access point. Furthermore, if a specific still image is displayed assuming interruption, it obstructs the HMD user's view. This poses a problem of safety in a system assuming movement.

SUMMARY OF THE INVENTION

The present invention has been made to solve the above-described problems. The present invention provides an image display system capable of providing a mixed reality environment to an observer without any sense of incongruity even upon switching wireless access points, an image display apparatus, a control method thereof, and a computer program.

According to an aspect of the present invention, there is provided an image display system including: an image display apparatus, an image processing apparatus and a plurality of wireless access points. The image display apparatus includes: an image capturing unit which captures an image of physical space; a wireless communication unit which communicates with the image processing apparatus, including transmission of the captured image obtained by the image capturing unit to the image processing apparatus, and a display unit which receives, from the image processing apparatus, a composite image of the captured image and a virtual image composited by the image processing apparatus and displays the composite image. The image processing apparatus includes: a generation unit which generates position and orientation information of the image display apparatus; a virtual image generation unit which generates the virtual image based on the position and orientation information, a composition unit which composites the captured image and the virtual image; and a communication unit which communicates with the image display apparatus, including transmission of the composite image obtained by the composition unit to the image display apparatus. The plurality of wireless access points are used for communication between the image display apparatus and the image processing apparatus. The image processing apparatus also includes: a determination unit that determines, based on a position of the image display apparatus, whether switching from a first wireless access point used for communication with the image display apparatus to a second wireless access point is necessary; and a switching instruction unit that, if the determination unit determines that the switching is necessary, transmits a switching instruction to the first wireless access point and the second wireless access point. The image display apparatus also includes: a communication control unit that, upon receiving the communication switching instruction from the first wireless access point used for communication with the image processing apparatus, disconnects communication with the first wireless access point and transmits, to the second wireless access point, a link request to establish communication with the second wireless access point of a new communication destination included in the switching instruction; and a display control unit that displays, on the display unit, the captured image continuously acquired from the image capturing unit until switching from the first wireless access point to the second wireless access point finishes as communication destination switching.

According to another aspect of the present invention, there is provided an image display system including an image display apparatus, an image processing apparatus and a plurality of wireless access points. The image display apparatus includes: an image capturing unit which captures an image of physical space, a wireless communication unit which communicates with the image processing apparatus, including transmission of the captured image obtained by the image capturing unit to the image processing apparatus, a display unit which receives, from the image processing apparatus, a composite image of the captured image and a virtual image composited by the image processing apparatus and displays the composite image, and an image superimposition display unit which superimposes a message image on a display image of the display unit. The image processing apparatus includes: a generation unit which generates position and orientation information of the image display apparatus, a virtual image generation unit which generates the virtual image based on the position and orientation information, a composition unit which composites the captured image and the virtual image, and a communication unit which communicates with the image display apparatus, including transmission of the composite image obtained by the composition unit to the image display apparatus. The plurality of wireless access points are used for communication between the image display apparatus and the image processing apparatus. The image processing apparatus also includes: a determination unit that determines, based on a position of the image display apparatus, whether switching from a first wireless access point used for communication with the image display apparatus to a second wireless access point is necessary; and a switching instruction unit that, if the determination unit determines that the switching is necessary, transmits a switching instruction to the first wireless access point and the second wireless access point. The image display apparatus includes: a communication control unit that, upon receiving the communication switching instruction from the first wireless access point used for communication with the image processing apparatus, disconnects communication with the first wireless access point and transmits, to the second wireless access point, a link request to establish communication with the second wireless access point of a new communication destination included in the switching instruction; and a display control unit that causes the image superimposition display unit to superimpose the message image on the display image of the display unit until switching from the first wireless access point to the second wireless access point finishes as communication destination switching.

According to another aspect of the present invention, there is provided an image display system including: an image display apparatus, an image processing apparatus, and plurality of wireless access points. The image display apparatus includes: an image capturing unit which captures an image of physical space, a storage unit which stores a virtual image, a composition unit which composites the captured image captured by the image capturing unit and the virtual image stored in the storage unit, a display unit which displays a composite image composited by the composition unit, and a wireless communication unit which communicates with the image processing apparatus, including reception of the virtual image from the image processing apparatus. The image processing apparatus includes: a virtual image generation unit which generates the virtual image based on position and orientation information of the image display apparatus; and a communication unit which communicates with the image display apparatus, including transmission of the virtual image to the image display apparatus. The plurality of wireless access points are used for communication between the image display apparatus and the image processing apparatus. The image processing apparatus also includes: a determination unit that determines, based on a position of the image display apparatus, whether switching from a first wireless access point used for communication with the image display apparatus to a second wireless access point is necessary; and a switching instruction unit that, if the determination unit determines that the switching is necessary, transmits a switching instruction to the first wireless access point and the second wireless access point. The image display apparatus also includes: a communication control unit that, upon receiving the communication switching instruction from the first wireless access point used for communication with the image processing apparatus, disconnects communication with the first wireless access point and transmits, to the second wireless access point, a link request to establish communication with the second wireless access point of a new communication destination included in the switching instruction; and a display control unit that displays, on the display unit, the composite image composited by the composition unit using the captured image and the virtual image received from the image processing apparatus immediately before the switching and stored in the storage unit until switching from the first wireless access point to the second wireless access point finishes as communication destination switching.

According to another aspect of the present invention, there is provided an image display apparatus including an image capturing unit which captures an image of physical space, and a display unit which receives, from an image processing apparatus, a composite image of a virtual image and the captured image captured by the image capturing unit, which is composited by the image processing apparatus, and displays the composite image. The image display apparatus includes: a wireless communication unit that communicates with the image processing apparatus via one of a plurality of wireless access points; a communication control unit that, upon receiving a communication switching instruction from a first wireless access point used for communication with the image processing apparatus, disconnects communication with the first wireless access point and transmits, to a second wireless access point, a link request to establish communication with the second wireless access point of a new communication destination included in the switching instruction; and a display control unit that displays, on the display unit, the captured image continuously acquired from the image capturing unit until switching from the first wireless access point to the second wireless access point finishes as communication destination switching.

According to yet another aspect of the present invention, there is provided an image display apparatus including an image capturing unit which captures an image of physical space, a display unit which receives, from an image processing apparatus, a composite image of a virtual image and the captured image captured by the image capturing unit, which is composited by the image processing apparatus, and displays the composite image, and an image superimposition display unit which superimposes a message image on a display image of the display unit. The image display apparatus includes: a wireless communication unit that communicates with the image processing apparatus via one of a plurality of wireless access points; a communication control unit that, upon receiving a communication switching instruction from a first wireless access point used for communication with the image processing apparatus, disconnects communication with the first wireless access point and transmits, to a second wireless access point, a link request to establish communication with the second wireless access point of a new communication destination included in the switching instruction; and a display control unit that causes the image superimposition display unit to superimpose the message image on the display image of the display unit until switching from the first wireless access point to the second wireless access point finishes as communication destination switching.

According to another aspect of the present invention, there is provided an image display apparatus including an image capturing unit which captures an image of physical space, a storage unit which stores a virtual image, a composition unit which composites the captured image captured by the image capturing unit and the virtual image stored in the storage unit, and a display unit which displays a composite image composited by the composition unit. The image display apparatus includes: a wireless communication unit that communicates with an image processing apparatus via one of a plurality of wireless access points; a communication control unit that, upon receiving a communication switching instruction from a first wireless access point used for communication with the image processing apparatus, disconnects communication with the first wireless access point and transmits, to a second wireless access point, a link request to establish communication with the second wireless access point of a new communication destination included in the switching instruction; and a display control unit that displays, on the display unit, the composite image composited by the composition unit using the captured image and the virtual image received from the image processing apparatus immediately before the switching and stored in the storage unit until switching from the first wireless access point to the second wireless access point finishes as communication destination switching.

According to yet another aspect of the present invention, there is provided a method of controlling an image display apparatus including an image capturing unit which captures an image of physical space, a display unit which receives, from an image processing apparatus, a composite image of a virtual image and the captured image captured by the image capturing unit, which is composited by the image processing apparatus, and displays the composite image, and a wireless communication unit which communicates with the image processing apparatus via one of a plurality of wireless access points. The method includes: upon receiving a communication switching instruction from a first wireless access point used for communication with the image processing apparatus, disconnecting communication with the first wireless access point and transmitting, to a second wireless access point, a link request to establish communication with the second wireless access point of a new communication destination included in the switching instruction; and displaying, on the display unit, the captured image continuously acquired from the image capturing unit until switching from the first wireless access point to the second wireless access point finishes as communication destination switching.

According to still another aspect of the present invention, there is provided a method of controlling an image display apparatus including an image capturing unit which captures an image of physical space, a display unit which receives, from an image processing apparatus, a composite image of a virtual image and the captured image captured by the image capturing unit, which is composited by the image processing apparatus, and displays the composite image, an image superimposition display unit which superimposes a message image on a display image of the display unit, and a wireless communication unit which communicates with the image processing apparatus via one of a plurality of wireless access points. The method includes: upon receiving a communication switching instruction from a first wireless access point used for communication with the image processing apparatus, disconnecting communication with the first wireless access point and transmitting, to a second wireless access point, a link request to establish communication with the second wireless access point of a new communication destination included in the switching instruction; and causing the image superimposition display unit to superimpose the message image on the display image of the display unit until switching from the first wireless access point to the second wireless access point finishes as communication destination switching.

According to still another aspect of the present invention, there is provided a method of controlling an image display apparatus including an image capturing unit which captures an image of physical space, a storage unit which stores a virtual image, a composition unit which composites the captured image captured by the image capturing unit and the virtual image stored in the storage unit, a display unit which displays a composite image composited by the composition unit, and a wireless communication unit which communicates with an image processing apparatus via one of a plurality of wireless access points. The method includes: upon receiving a communication switching instruction from a first wireless access point used for communication with the image processing apparatus, disconnecting communication with the first wireless access point and transmitting, to a second wireless access point, a link request to establish communication with the second wireless access point of a new communication destination included in the switching instruction; and displaying, on the display unit, the composite image composited by the composition unit using the captured image and the virtual image received from the image processing apparatus immediately before the switching and stored in the storage unit until switching from the first wireless access point to the second wireless access point finishes as communication destination switching.

According to another aspect of the present invention, a computer-readable medium has stored thereon a computer program to cause a computer to execute control of an image display apparatus including an image capturing unit which captures an image of physical space, a display unit which receives, from an image processing apparatus, a composite image of a virtual image and the captured image captured by the image capturing unit, which is composited by the image processing apparatus, and displays the composite image, and a wireless communication unit which communicates with the image processing apparatus via one of a plurality of wireless access points, by causing the computer to execute: a communication control step of, upon receiving a communication switching instruction from a first wireless access point used for communication with the image processing apparatus, disconnecting communication with the first wireless access point and transmitting, to a second wireless access point, a link request to establish communication with the second wireless access point of a new communication destination included in the switching instruction; and a display control step of displaying, on the display unit, the captured image continuously acquired from the image capturing unit until switching from the first wireless access point to the second wireless access point finishes as communication destination switching.

According to yet another aspect of the present invention, a computer-readable medium has stored thereon a computer program to cause a computer to execute control of an image display apparatus including an image capturing unit which captures an image of physical space, a display unit which receives, from an image processing apparatus, a composite image of a virtual image and the captured image captured by the image capturing unit, which is composited by the image processing apparatus, and displays the composite image, an image superimposition display unit which superimposes a message image on a display image of the display unit, and a wireless communication unit which communicates with the image processing apparatus via one of a plurality of wireless access points, by causing the computer to execute: a communication control step of, upon receiving a communication switching instruction from a first wireless access point used for communication with the image processing apparatus, disconnecting communication with the first wireless access point and transmitting, to a second wireless access point, a link request to establish communication with the second wireless access point of a new communication destination included in the switching instruction; and a display control step of causing the image superimposition display unit to superimpose the message image on the display image of the display unit until switching from the first wireless access point to the second wireless access point finishes as communication destination switching.

According to still another aspect of the present invention, a computer-readable medium has stored thereon a computer program to cause a computer to execute control of an image display apparatus including an image capturing unit which captures an image of physical space, a storage unit which stores a virtual image, a composition unit which composites the captured image captured by the image capturing unit and the virtual image stored in the storage unit, a display unit which displays a composite image composited by the composition unit, and a wireless communication unit which communicates with an image processing apparatus via one of a plurality of wireless access points, by causing the computer to execute: a communication control step of, upon receiving a communication switching instruction from a first wireless access point used for communication with the image processing apparatus, disconnecting communication with the first wireless access point and transmitting, to a second wireless access point, a link request to establish communication with the second wireless access point of a new communication destination included in the switching instruction; and a display control step of displaying, on the display unit, the composite image composited by the composition unit using the captured image and the virtual image received from the image processing apparatus immediately before the switching and stored in the storage unit until switching from the first wireless access point to the second wireless access point finishes as communication destination switching.

Further features of the present invention will become apparent from the following description of exemplary embodiments with reference to the attached drawings.

BRIEF DESCRIPTION OF THE DRAWINGS

FIGS. 2A and 2B are sequence charts showing the data flow between the apparatuses and their process contents according to the first embodiment of the present invention;

FIG. 5A is a view showing an example of a message image displayed by the On Screen Display (OSD) unit of the image display apparatus according to the second embodiment of the present invention;

FIG. 5B is a view showing another example of the message image displayed by the OSD unit of the image display apparatus according to the second embodiment of the present invention;

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
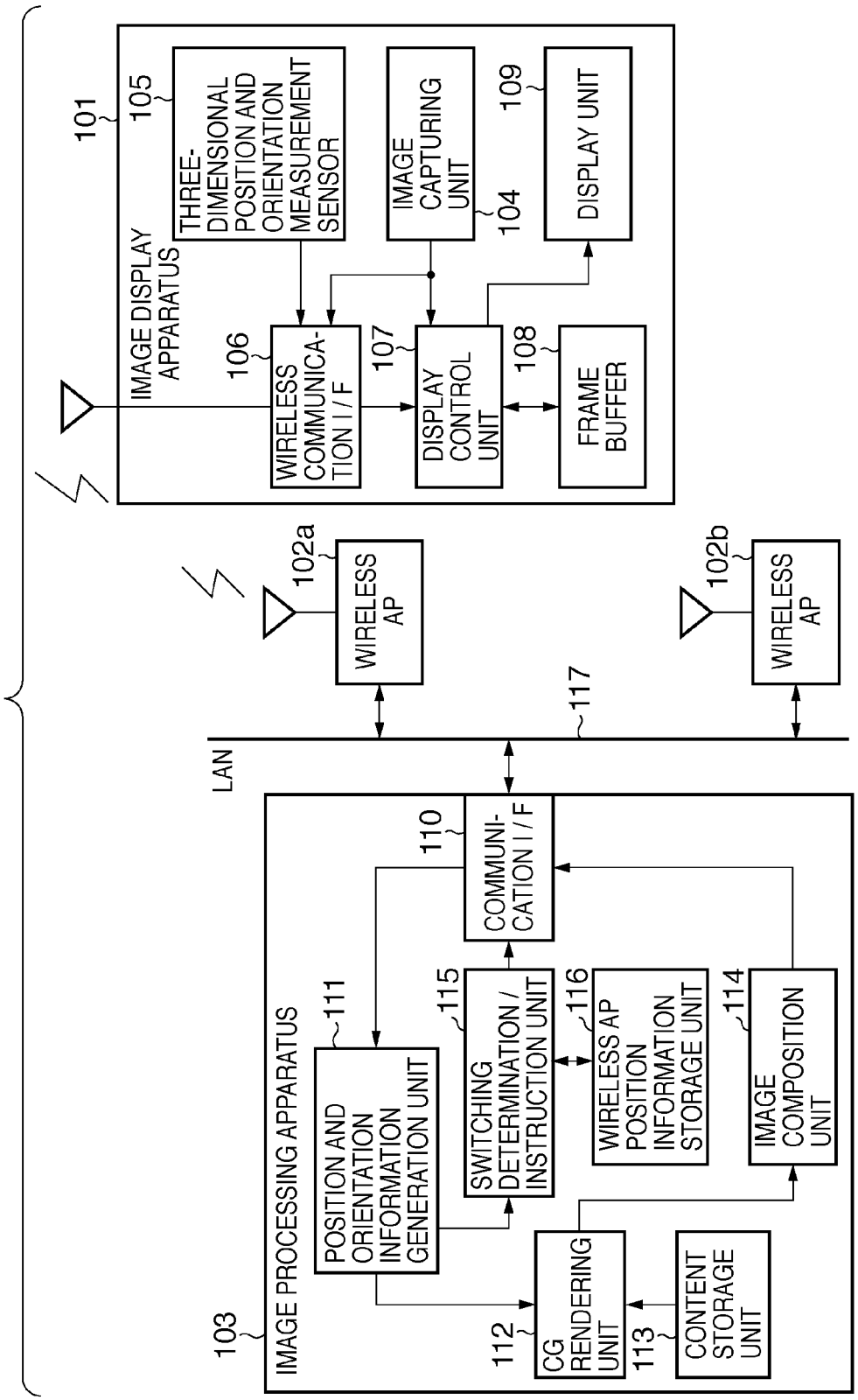
FIG. 1 is a functional block diagram of an image display system according to a first embodiment of the present invention.

FIG. 1 is a functional block diagram of an image display system according to a first exemplary embodiment of the present invention.

An image display apparatus 101 is assumed to be, for example, a video see-through HMD. The image display apparatus 101 has an image capturing unit 104, three-dimensional position and orientation measurement sensor 105, wireless communication I/F (wireless communication unit) 106, display control unit 107, frame buffer (storage unit) 108, and display unit 109.

Figure 10:
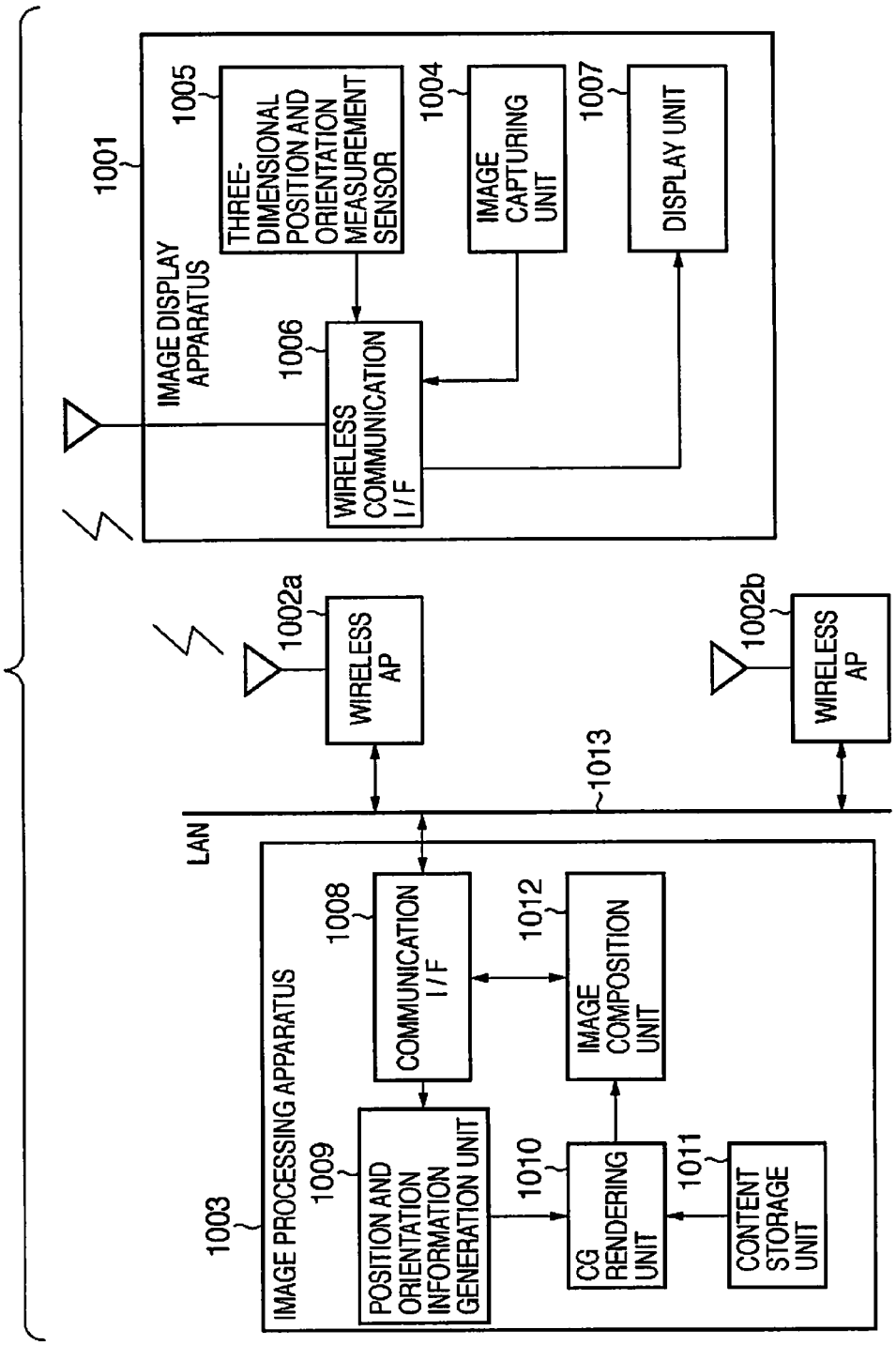
FIG. 10 is a functional block diagram of a conventional video see-through mixed reality wireless system.
Figure 11:
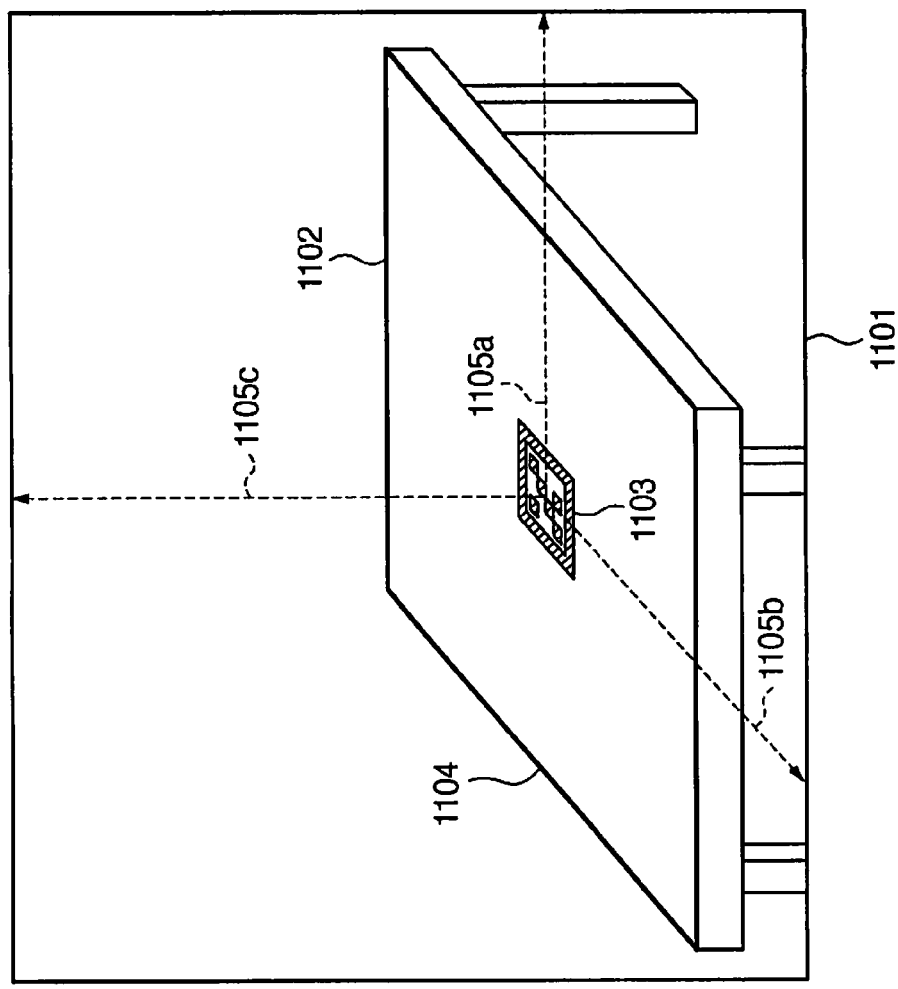
FIG. 11 is a view showing the concept of position and orientation information generation using a marker in the prior art.

The image capturing unit 104, three-dimensional position and orientation measurement sensor 105, wireless communication I/F 106, and display unit 109 correspond to the image capturing unit 1004, three-dimensional position and orientation measurement sensor 1005, wireless communication I/F 1006, and display unit 1007 in FIG. 10, respectively. Wireless APs 102a and 102b (first wireless access point and second wireless access point) correspond to the wireless access points 1002a and 1002b in FIG. 10, respectively. Hence, FIG. 1 will be described concerning different points from FIG. 10.

The three-dimensional position and orientation measurement sensor 105 outputs information to grasp the motion or the position and orientation of the HMD user's head. The three-dimensional position and orientation measurement sensor 105 is incorporated in the image display apparatus 101.

However, this is not essential when using an application that allows for grasping the position and orientation based on a marker in a captured image.

The wireless communication I/F 106 transmits a captured image (physical space image) and position and orientation information to the wireless access point (AP) 102*a* or 102*b* and receives a composite image generated by an image processing apparatus 103 via the wireless AP 102*a* or 102*b*. The wireless communication I/F 106 performs the following communication control for each wireless access point. Upon receiving a communication disconnection instruction from the first wireless access point which is being used for communication with the image processing apparatus 103, the wireless communication I/F 106 disconnects the communication with the first wireless access point. Then, the wireless communication I/F 106 transmits a link request to the second wireless access point to establish communication with the second wireless access point that is the new communication destination contained in the disconnection instruction.

The wireless communication I/F 106 needs to perform real-time processing and preferably uses a communication standard capable of high-bandwidth transmission. For example, high-speed wireless communication based on IEEE 802.11 wireless LAN or IEEE 802.15 wireless PAN standard is used. This embodiment will assume the use of UWB (Ultra Wide Band). The transmission rate of UWB is several hundred Mbps.

The display control unit 107 controls display upon handover as wireless AP switching processing. This processing will be described later in detail. The frame buffer 108 is a memory which stores each frame of a received MR image. How to use the stored MR image will also be described later.

The image processing apparatus 103 renders a CG image based on the captured image and the position and orientation information received from the image display apparatus 101 and executes composition processing of generating a composite image of the CG image and the captured image.

The image processing apparatus 103 has a communication I/F (communication unit) 110, position and orientation information generation unit 111, CG rendering unit 112, content storage unit 113, image composition unit 114, switching determination/instruction unit 115, and wireless AP position information storage unit 116.

The communication I/F 110 performs data communication with the wireless AP 102*a* or 102*b*. The communication I/F 110 is used to transmit a captured image and position and orientation information received by the wireless AP 102*a* or 102*b* and a composite image generated by the image processing apparatus 103. The communication I/F 110 may be a wireless communication I/F capable of direct wireless communication with the wireless AP 102*a* or 102*b* without intervening a LAN 117.

The position and orientation information generation unit 111 generates the position and orientation information of the HMD user based on the received captured image. In particular, the position and orientation information generation unit 111 generates position and orientation information by extracting a marker or a feature point serving as a marker from the captured image. The position and orientation information generation unit 111 can increase the accuracy by complementarily using a captured image from an objective viewpoint (not shown) or information obtained by the three-dimensional position and orientation measurement sensor 105 of the image display apparatus 101, thus coping with a case that the captured image contains neither a marker nor a feature point to be used.

The CG rendering unit (virtual image generation unit) 112 renders a CG image that is a virtual image based on the position and orientation information and a content acquired from the content storage unit 113. The content storage unit 113 stores contents for generating a CG image. The image composition unit 114 composites the virtual image generated by the CG rendering unit 112 with the background, that is, the captured image captured in the image display apparatus 101.

Based on the positional relationship between the image display apparatus 101 and the plurality of wireless APs 102*a* and 102*b*, the switching determination/instruction unit 115 calculates the distances between the apparatuses. The switching determination/instruction unit 115 determines based on the calculation result whether it is necessary to leave the communication area of a wireless AP 102 and switch to the communication area of another wireless AP 102. Upon determining that switching is necessary, the switching determination/instruction unit 115 transmits a switching instruction of the wireless AP 102 to the wireless AP 102 of the current link, the image display apparatus 101, and the wireless AP of the new link establishment target.

The wireless AP position information storage unit 116 is a data table which stores the position information of each wireless AP 102. The wireless AP position information storage unit stores the information of the installation position and can be updated.

The LAN (Local Area Network) 117 connects the plurality of wireless APs 102 and the image processing apparatus 103. In the first embodiment, two wireless APs 102*a* and 102*b* and one image processing apparatus 103 are connected. However, the number of apparatuses changes depending on the moving range of the HMD user and the area coverage of each wireless AP 102. If the process load is too heavy for one image processing apparatus, a plurality of image processing apparatuses may be connected to the LAN 117 to distribute the process load.

The description of the first embodiment will be made assuming that the functional blocks of the image display apparatus 101 are included in one apparatus. However, the same functions can also be implemented by separately including the functions in two or more apparatuses.

The image display apparatus 101 transmits a captured image and the position and orientation information of the three-dimensional position and orientation measurement sensor 105 together to the wireless AP 102*a* of the current link via the wireless communication I/F 106.

The wireless AP 102*a* transmits the received captured image and position and orientation information to the image processing apparatus 103 via the LAN 117.

The image processing apparatus 103 grasps the position and orientation of the image display apparatus 101 using the received captured image and position and orientation information and determines the line-of-sight position of the HMD user. Based on the obtained position and orientation information and content for CG rendering, the image processing apparatus generates a desired CG image and superimposes it on the received captured image. The obtained composite image is transmitted to the wireless AP 102*a* via the communication I/F 110.

Then, the wireless AP 102*a* transmits the received composite image to the image display apparatus 101 by wireless communication.

If the composite image is normally received, the image display apparatus 101 displays the composite image for the HMD user via the display unit 109. General image formation processing has been described above.

An operation in switching will be described next.

The HMD user who moves in a wireless area may go out of the communication area of the wireless AP 102a of the current link. Whether to go out of the communication area is determined based on distance information calculated based on the position information of the wireless AP 102 stored in the wireless AP position information storage unit 116 and the position information of the image display apparatus 101.

Whether it is necessary to switch from the wireless AP 102a of the current link to the wireless AP 102b is determined based on the distance to each wireless AP. Prediction based on a time-rate change may also be taken into consideration. For example, if it can be determined that the user is leaving the wireless AP 102a of the current link and approaching the wireless AP 102b, the switching instruction is sent to both the wireless AP 102 of the current link and that of the next link. The instruction is also transmitted to the image display apparatus 101 via the wireless AP 102a.

The image display apparatus 101 that has received the instruction cannot receive the composite image during handover (until the end of switching). During this time, the image display apparatus displays the captured image acquired in real time. Even after establishment of the link, the image display apparatus continuously displays the captured image until reception of a new composite image. This processing and other display control will be described later in detail.

The above-described arrangement and processing enable to ensure the HMD user's view and image display without impairing the mixed reality even when composite image transmission is interrupted during handover.

The data flow between the image display apparatus 101, wireless APs 102a and 102b, and the image processing apparatus 103 and their process contents will be described next with reference to FIGS. 2A and 2B.

Figure 2B:
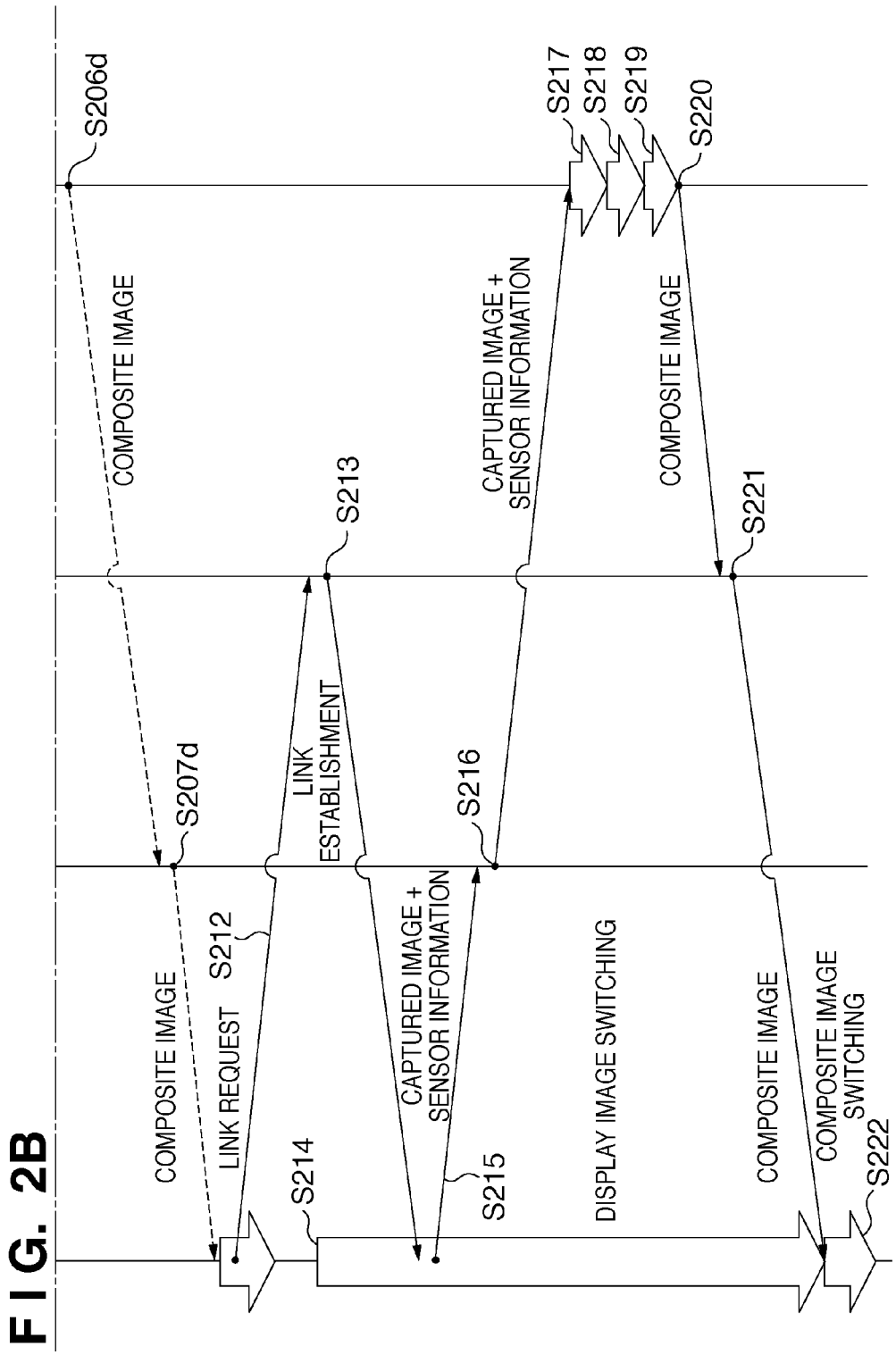

FIGS. 2A and 2B are sequence charts showing the data flow between the apparatuses and their process contents according to the first embodiment of the present invention.

FIGS. 2A and 2B particularly show the sequence of processing of switching the link from the wireless AP 102a (to be referred as an AP 1 hereinafter) of current wireless communication to the wireless AP 102b (to be referred as an AP 2 hereinafter) as the HMD user moves.

In step S201, the image display apparatus 101 transmits an acquired captured image and the sensor information of the three-dimensional position and orientation measurement sensor to the AP 1 in the linked state. Note that the image display apparatus 101 periodically acquires a captured image and sensor information and therefore transmits these data to the AP 1 asynchronous to the processes of the remaining apparatuses (steps S201a to S201d).

In step S202, the AP 1 transmits the received captured image and sensor information to the image processing apparatus 103.

In step S203, the image processing apparatus 103 generates position and orientation information by extracting a feature point from the received captured image. The position and orientation information can be generated either by calculating the position and orientation based on the sensor information or by complementarily using the sensor information. In step S204, the image processing apparatus 103 generates a CG image as a virtual image based on the generated position and orientation information. In step S205, the image processing apparatus 103 generates a mixed reality image (MR image) as a composite image by superimposing the generated CG image on the received captured image. In step S206, the image processing apparatus 103 transmits the generated composite image to the AP 1.

In step S207, the AP 1 transmits the received composite image to the image display apparatus 101. The image display apparatus 101 displays the received composite image.

In step S208, the image processing apparatus 103 calculates the distances between the apparatuses based on the position of the image display apparatus 101 and the positions of the APs 1 and 2 and determines whether AP switching is necessary. In this example, assume that the HMD user who is present in the areas of the APs 1 and 2 is expected to leave the area of the AP 1 of the current link and enter the area of the AP 2. In this case, the image processing apparatus 103 determines switching from the AP 1 to the AP 2.

In step S209, the image processing apparatus 103 transmits a link switching instruction (disconnection) to the AP 1 of the current link in accordance with the AP switching determination result. The transmitted information includes the switching instruction, the physical ID of the wireless AP of the next link destination, and its channel information in use. The channel number in use is not indispensable. However, if it is grasped in advance, the time until link establishment can be shortened.

In step S210, the AP 1 transmits the switching instruction from the image processing apparatus 103 to the image display apparatus 101. The image display apparatus 101 continuously displays the composite image until receiving a composite image corresponding to the previously transmitted captured image (from step S201b). The contents of the display control processing on the side of the image display apparatus 101 will be described later with reference to another flowchart.

In step S211, the image processing apparatus 103 transmits a switching instruction (link) to the AP 2 of the new link establishment target. Link establishment is not actually done based on this instruction. However, it is possible to shorten the time until link establishment by notifying the AP 2 of the physical ID and the like of the image display apparatus 101 as the communication destination.

In step S206d, the image processing apparatus 103 transmits, to the AP 1, a composite image corresponding to the final captured image received from the image display apparatus 101 via the AP 1.

In step S207d, the AP 1 transmits the received composite image to the image display apparatus 101.

In step S212, the image display apparatus 101 disconnects the link to the AP 1 and transmits a link request to the AP 2 of the new link establishment target.

In step S213, the AP 2 receives the link request from the image display apparatus 101, establishes a link, and notifies the image display apparatus 101 of it.

In step S214, the image display apparatus 101 performs display control before updating display of the final composite image received via the AP 1 in step S207d to change the display image until handover finishes and an image from the AP 2 of the new link is received. The display control will be described later in detail.

In step S215, the image display apparatus 101 transmits the acquired captured image and sensor information to the AP 2.

In step S216, the AP 2 transmits the received captured image and sensor information to the image processing apparatus 103.

In step S217, the image processing apparatus 103 generates position and orientation information by extracting a feature point from the received captured image. The contents are the same as in step S203. In step S218, the image processing apparatus 103 generates a CG image as a virtual image based on the generated position and orientation information. The contents are the same as in step S204. In step S219, the image processing apparatus 103 generates a mixed reality image (MR image) as a composite image by superimposing the generated CG image on the received captured image. The contents are the same as in step S205. In step S220, the image processing apparatus 103 transmits the generated composite image to the AP 2.

In step S221, the AP 2 transmits the received composite image to the image display apparatus 101.

Upon receiving the composite image to be displayed, the image display apparatus 101 finishes the display image switching control and displays the received composite image in step S222.

The main sequence of wireless AP switching has been described above.

The display image switching processing of the image display apparatus 101 in step S214 of FIG. 2B will be described next with reference to FIG. 3.

Figure 3:
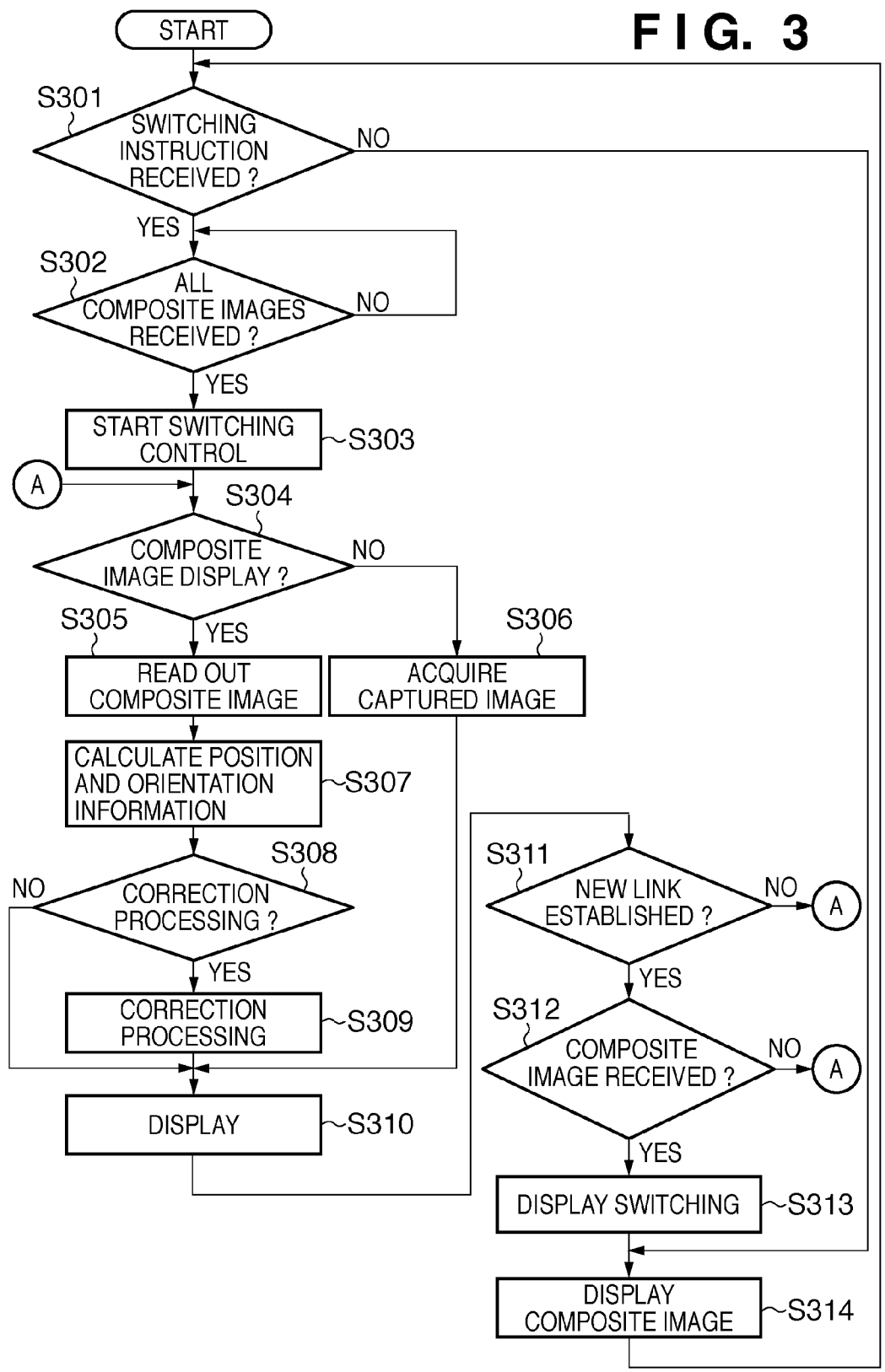
FIG. 3 is a flowchart illustrating the display image switching processing of the image display apparatus according to the first embodiment of the present invention.

FIG. 3 is a flowchart illustrating the display image switching processing of the image display apparatus according to the first embodiment of the present invention.

In step S301, the image display apparatus 101 determines whether a switching instruction from the image processing apparatus 103 is received via the wireless AP. If a switching instruction is received (YES in step S301), the process advances to step S302. If no switching instruction is received (NO in step S301), the process advances to step S314. Note that the switching instruction includes connection destination information representing the wireless AP to be connected next.

In step S302, the image display apparatus 101 determines whether all composite images corresponding to captured images already transmitted until reception of the switching instruction are received. If all composite images are received (YES in step S302), the process advances to step S303. If a composite image is not received yet (NO in step S302), the process waits until all composite images are received.

When all composite images are received, the image display apparatus 101 starts switching control in step S303. More specifically, the image display apparatus disconnects the link to the wireless AP of the current link and starts negotiating with the wireless AP of the new link establishment target.

In step S304, the image display apparatus 101 determines whether to display a composite image acquired immediately before the link disconnection until new link establishment and subsequent reception of a display image (composite image).

This determination is done based on whether, for example, the composite image contains a CG image and whether the HMD user has moved largely (a predetermined distance or more) at the time of link disconnection. In exemplary embodiments, if the composite image contains no CG image, the captured image is directly displayed and display of the composite image is not selected. During movement, the physical world to be displayed for the HMD user may be widely different from the composite image. Hence, display of the composite image is not selected in this case.

If it is determined to display the composite image (YES in step S304), the process advances to step S305. To directly display the captured image without displaying the composite image (NO in step S304), the process advances to step S306. In selecting the image to be displayed, whether to display the composite image can be determined every display image update timing. Alternatively, determination may be done at the start of handover so that the selected image is continuously displayed until the end of display switching.

In step S305, the image display apparatus 101 reads out the composite image acquired and stored in the frame buffer 108 immediately before the link disconnection.

Next, in step S307, the image display apparatus 101 calculates the current position and orientation information. More specifically, the image display apparatus calculates the position and orientation information of the HMD user's head based on the output information of the three-dimensional position and orientation measurement sensor.

In step S308, the image display apparatus 101 determines whether to execute composite image correction processing. The composite image correction processing is done in accordance with a change of the position and orientation of the HMD user. To execute correction processing (YES in step S308), the process advances to step S309. If correction processing is not to be executed (NO in step S308), the process advances to step S310.

In step S309, in moving in the left, right, upper, or lower direction, the image display apparatus 101 executes correction processing of generating an image obtained by moving the composite image in the desired direction. In moving back and forth, the resolution of the composite image is converted. If movement is done in a plurality of directions, the image display apparatus executes correction processing based on the combination of the directions. Then processing advances to step S310.

In step S306 (if it has been determined in step S304 that a composite image is not to be displayed), the image display apparatus 101 acquires a captured image. Then, processing advances to step S310.

In step S310, the image display apparatus 101 displays one of the corrected composite image, uncorrected composite image, and captured image on the display unit 109 while updating until establishment of the link with the new wireless AP and reception of a composite image.

In step S311, the image display apparatus 101 determines whether the new link has been established. If the link has been established, and captured image transmission has started (YES in step S311), the process advances to step S312. If the link has not been established yet, and handover is progressing (NO in step S311), the process returns to step S304.

In step S312, the image display apparatus 101 determines whether handover has finished, and a composite image corresponding to the captured image transmitted to the wireless AP of the newly established link has been received. This is because there is a time lag from acquisition and transmission of a captured image to generation and reception of a composite image. If a composite image has been received from the wireless AP of the newly established link (YES in step S312), the process advances to step S313. If no composite image has been received (NO in step S312), the process returns to step S304.

When the composite image to be displayed is received, the display control unit 107 of the image display apparatus 101 switches the display image in step S313. More specifically, display control of one of the corrected composite image, uncorrected composite image, and captured image, which is displayed so far, is ended.

In step S314, the image display apparatus 101 displays the received composite image on the display unit 109. After that, the image display apparatus displays, on the display unit 109, composite images that are continuously received until switching of the wireless AP occurs again.

As described above, according to the first embodiment, a captured image captured in real time is displayed at the time of switching the wireless AP, thus ensuring the HMD user's view during handover until establishment of the link with the next wireless AP. It is also possible to continue display without impairing the mixed reality by displaying the composite image immediately before link disconnection while correcting it in accordance with the HMD's position and orientation.

In the first embodiment, an arrangement has been described, which controls display of captured images continuously acquired in real time until establishment of the link with the next wireless AP and reception of a composite image. In a second embodiment, an arrangement will be described, which presents a superimposed message to call the HMD user's attention while performing the same display control.

The functional arrangement of an image display apparatus according to the second embodiment will be described first.

Figure 4:
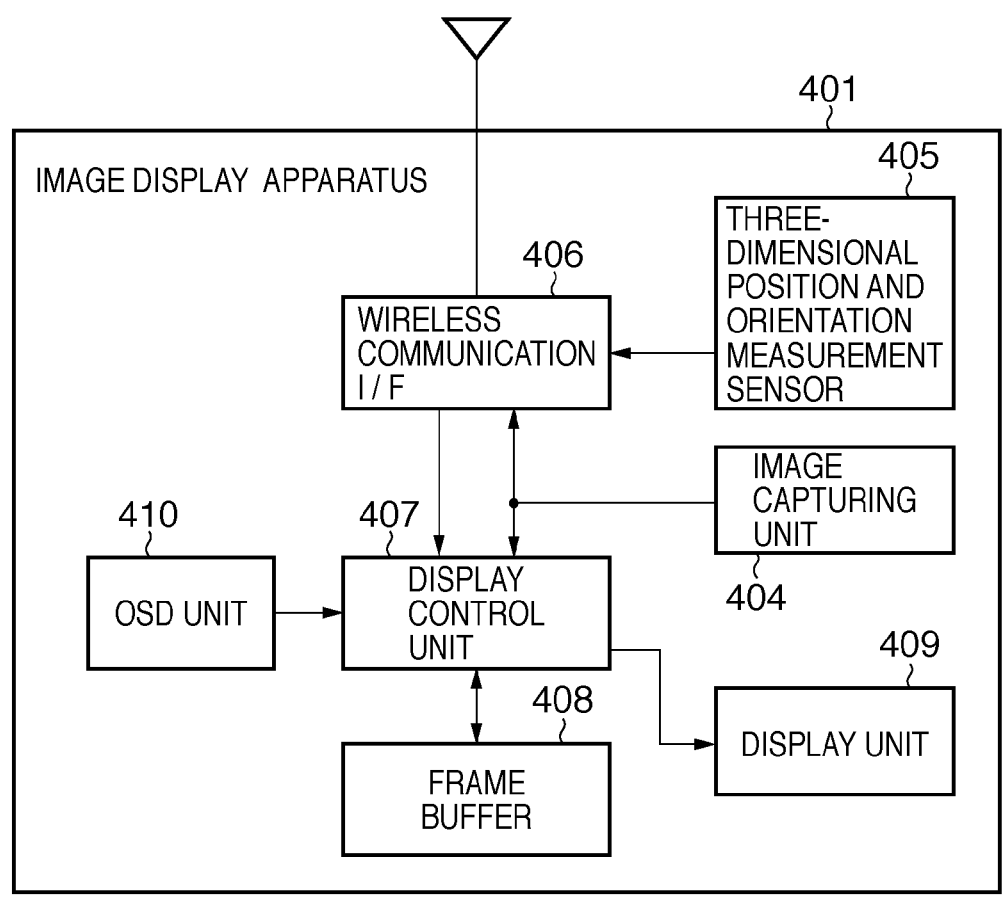
FIG. 4 is a functional block diagram of an image display apparatus according to a second embodiment of the present invention.

FIG. 4 is a functional block diagram of the image display apparatus according to the second embodiment of the present invention.

An image display apparatus 401 is assumed to be, for example, a video see-through HMD. The image display apparatus 401 has an image capturing unit 404, three-dimensional position and orientation measurement sensor 405, wireless communication I/F 406, display control unit 407, frame buffer 408, display unit 409, and OSD unit 410.

The image capturing unit 404, three-dimensional position and orientation measurement sensor 405, and wireless communication I/F 406 correspond to the image capturing unit 104, three-dimensional position and orientation measurement sensor 105, and wireless communication I/F 106 in FIG. 1, respectively. The display control unit 407, frame buffer 408, and display unit 409 correspond to the display control unit 107, frame buffer 108, and display unit 109 in FIG. 1, respectively. Hence, a detailed description of them will not be repeated, and the OSD unit 410 as a new component will be described. The image display apparatus 401, and the image processing apparatus 103 and the wireless APs 102a and 102b in FIG. 1 implement an image display system.

The OSD unit 410 is an OSD (On Screen Display) unit (image superimposition display unit) which superimposes a message image formed from, for example, a text or an image on a display image. An example of display contents and the process sequence will be described later. Particularly, if handover occurs when the HMD user is moving a long distance, the OSD unit 410 allows displaying a message for the purpose of calling the HMD user's attention until wireless AP switching finishes and composite image reception is enabled.

An example of display by the OSD unit 410 will be described with reference to FIGS. 5A and 5B.

FIGS. 5A and 5B are views showing examples of message images displayed by the OSD unit of the image display apparatus according to the second embodiment of the present invention.

FIG. 5A shows an example of a message representing that wireless AP switching is progressing. The message is actually continuously displayed after link establishment to transmission of a captured image and reception of a composite image corresponding to the transmitted captured image. The display image serving as the background is the captured image, composite image, or corrected composite image, as in the first embodiment.

When the image displayed for the HMD user contains a CG image, it abruptly disappears upon switching the display image to the captured image. The composite image is displayed after predetermined processing and therefore has a delay with respect to the captured image. The second embodiment can produce a sense of security for the user by presenting the cause of the sense of incongruity generated upon switching.

FIG. 5B shows a display example in which a message to call the user's attention is added to the message representing that switching is progressing. It is possible to ensure safety for the user by limiting area movement until the display image switching processing finishes.

The display image switching processing of the image display apparatus 401 according to the second embodiment will be described next with reference to FIG. 6.

Figure 6:
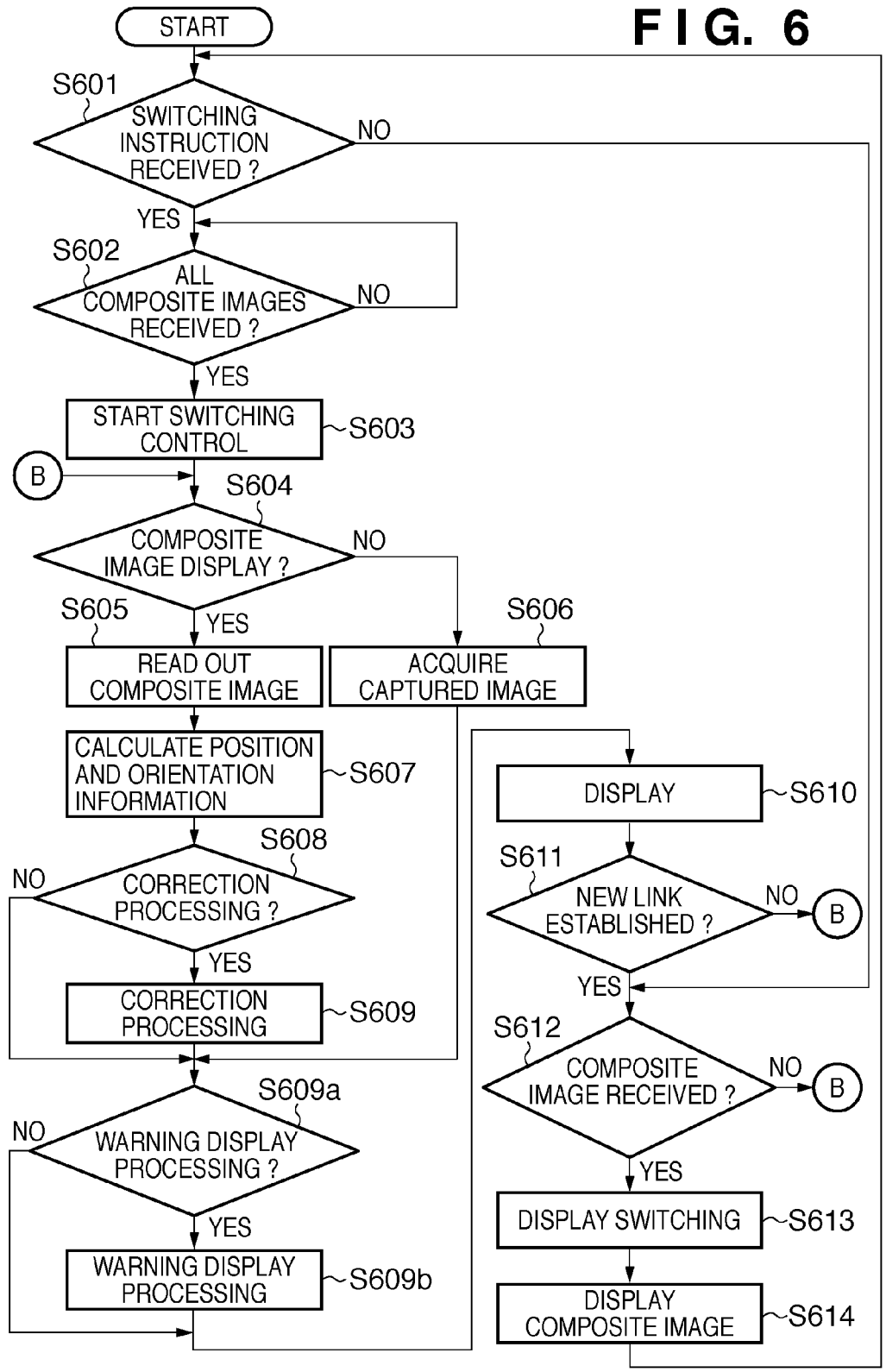
FIG. 6 is a flowchart illustrating the display image switching processing of the image display apparatus according to the second embodiment of the present invention.

FIG. 6 is a flowchart illustrating the display image switching processing of the image display apparatus according to the second embodiment of the present invention.

Steps S601 to S609 and steps S610 to S614 in FIG. 6 correspond to steps S301 to S309 and steps S310 to S314 in FIG. 3 of the first embodiment, and a detailed description thereof will not be repeated.

Referring to FIG. 6, in step S609a, the image display apparatus 401 determines whether to execute warning display processing of displaying a message to call the HMD user's attention. Switching and selection of the message display can be done by the HMD user either from an input unit such as a switch provided on the image display apparatus 401 or from the input unit of the image processing apparatus 103. To execute warning display processing (YES in step S609a), the process advances to step S609b. If warning display processing is not to be executed (NO in step S609a), the process advances to step S610.

In step S609b, the image display apparatus 401 executes the warning display processing. More specifically, the OSD unit 410 superimposes a message prepared in advance to call the user's attention on the display image.

As described above, according to the second embodiment, in switching the wireless AP and displaying a captured image captured in real time or a composite image acquired immediately before disconnection, a message is presented to the user, thus limiting his/her action or calling his/her attention. An example of the message represents that handover is progressing.

In the first and second embodiments, an arrangement has been described, in which the image display apparatus transmits a captured image to the image processing apparatus and receives and displays a composite image containing a CG image which is superimposed in the image processing apparatus. In a third embodiment, an arrangement will be described, in which an image display apparatus transmits at least position and orientation information to an image processing apparatus, receives a CG image generated based on the position and orientation information in the image processing apparatus, and composites the captured image with the CG image.

Figure 7:
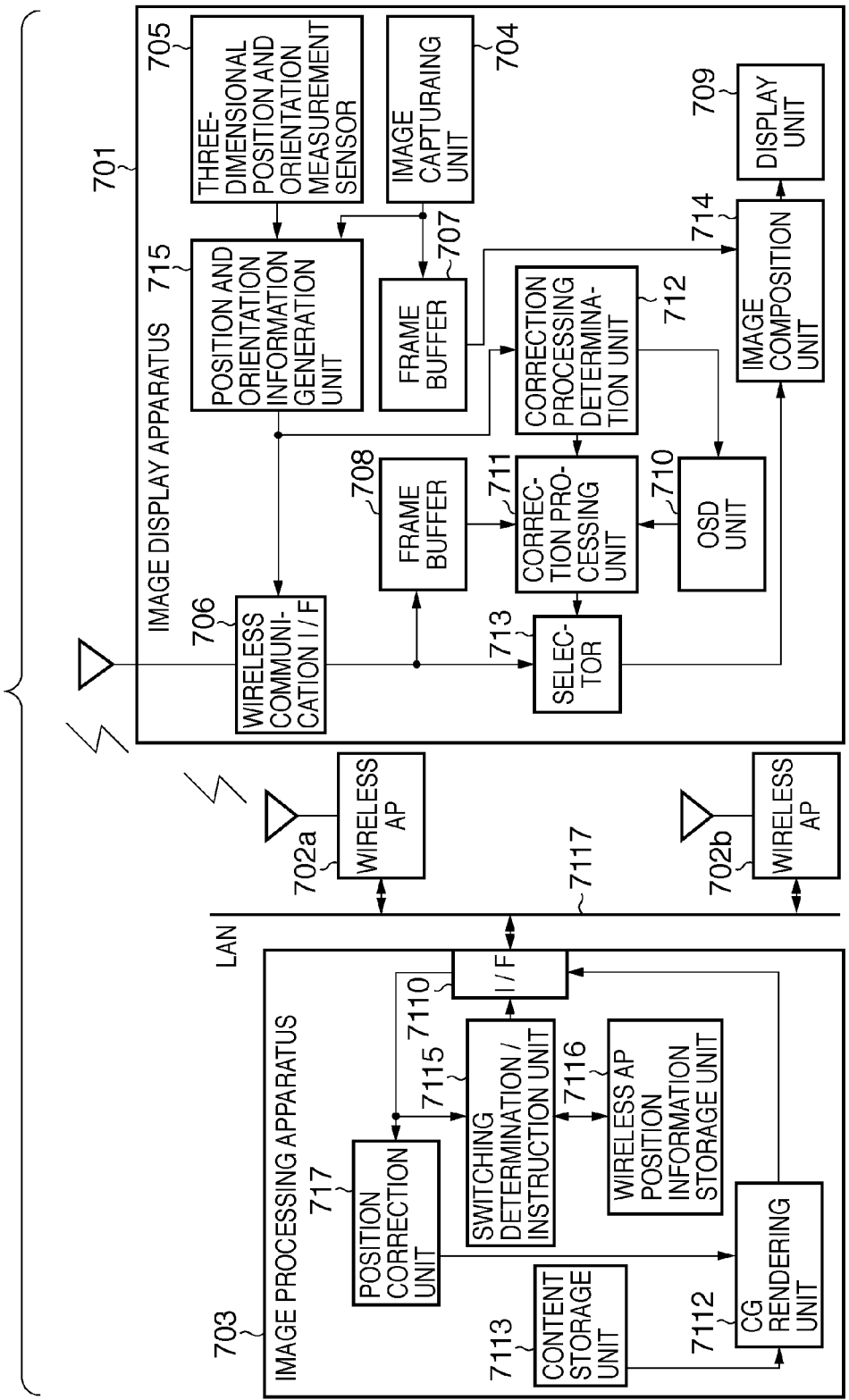
FIG. 7 is a functional block diagram of an image display system according to a third embodiment of the present invention.

FIG. 7 is a functional block diagram of the image display apparatus according to the third embodiment of the present invention.

An image display apparatus 701 is assumed to be, for example, a video see-through HMD. The image display apparatus 701 has an image capturing unit 704, three-dimensional position and orientation measurement sensor 705, wireless communication I/F 706, frame buffers 707 and 708, display unit 709, and OSD unit 710. The image display apparatus 701 also includes a correction processing unit 711, correction processing determination unit 712, selector 713, image composition unit 714, and position and orientation information generation unit 715.

The image capturing unit 704, three-dimensional position and orientation measurement sensor 705, and wireless communication I/F 706 correspond to the image capturing unit 404, three-dimensional position and orientation measurement sensor 405, and wireless communication I/F 406 in FIG.

4, respectively. The display unit 709 and the OSD unit 710 correspond to the display unit 409 and the OSD unit 410 in FIG. 4, respectively. Hence, a detailed description of them will not be repeated, and new components will be described.

Wireless APs 702a and 702b and a LAN 7117 correspond to the wireless APs 102a and 102b and the LAN 117 in FIG. 1, respectively.

In the image display apparatus 701, the wireless communication I/F 706 transmits position and orientation information to the wireless AP 702a or 702b and receives a CG image generated by an image processing apparatus 703 via the wireless AP 702a or 702b. The image display apparatus 701 transmits position and orientation information here. However, it may transmit a captured image together.

The frame buffer 707 is a memory which stores each frame of an acquired captured image. The frame buffer 708 is a memory which stores each frame of a CG image received from the image processing apparatus 703.

The correction processing unit 711 corrects the display position of the CG image. This will be described later in detail. The correction processing determination unit 712 determines based on the position and orientation information whether correction of the display position with respect to the virtual image is possible, and if correction is to be performed, determines which kind of correction is to be executed. This will be described later in detail.

The selector 713 selects a CG image to be composited with the captured image. Normally, the selector selects the received CG image. During switching processing for handover, the selector selects an already acquired CG image stored in the frame buffer 708 or a CG image after display position correction.

The image composition unit 714 composites the captured image with the CG image. The image composition unit 714 can composite a captured image temporarily stored in the frame buffer 707 with a CG image corresponding to the captured image. The image composition unit 714 can also composite a captured image continuously acquired in real time with a CG image generated at a display position predicted in consideration of the timing of composition.

The position and orientation information generation unit 715 generates the HMD user's position and orientation information based on the captured image and the output information from the three-dimensional position and orientation measurement sensor 705.

The image processing apparatus 703 renders a CG image based on the position and orientation information received from the image display apparatus 701.

The image processing apparatus 703 comprises a communication I/F 7110, CG rendering unit 7112, content storage unit 7113, switching determination/instruction unit 7115, wireless AP position information storage unit 7116, and position correction unit 717.

The communication I/F 7110, CG rendering unit 7112, and content storage unit 7113 correspond to the communication I/F 110, CG rendering unit 112, and content storage unit 113 in FIG. 1, respectively. The switching determination/instruction unit 7115 and the wireless AP position information storage unit 7116 correspond to the determination/instruction unit 115 and the wireless AP position information storage unit 116 in FIG. 1, respectively. Hence, a detailed description of them will not be repeated, and new components will be described.

The position correction unit 717 corrects the position and orientation information generated by the image display apparatus 701 in accordance with the image generation timing. For example, time-serially grasped position and orientation information in the past is corrected to position and orientation information at the time of image composition. The processing can be done using a general prediction method. A method using a Kalman filter is well-known. Correction is done based on the image composition timing here. However, it may be done based on the composite image display timing. In this case, for the captured image, a short time lag is generated from acquisition to display. However, the CG image appears to ensure real time processing unless the there is a significant error in the prediction.

Processing without CG image correction processing will be described next.

The captured image obtained by the image capturing unit 704 is stored in the frame buffer 707. The captured image is used by the position and orientation information generation unit 715 to calculate the position and orientation information of the image display apparatus 701 together with the output from the three-dimensional position and orientation measurement sensor 705.

The generated position and orientation information is transmitted from the wireless communication I/F 706 to the image processing apparatus 703 via the wireless AP 702a. In the image processing apparatus 703, the CG rendering unit 7112 renders a CG image based on the received position and orientation information. The CG image is transmitted from the communication I/F 7110 to the image display apparatus 701 via the wireless AP 702a. When image composition is done by chromakey processing, a specific color (chromakey color) which is not used for CG rendering but is to be used for chromakey composition is also sent as information. If specific color designation is not performed for each frame, negotiation with the image display apparatus 701 is done in advance to use the same specific color during a predetermined period.

In the image display apparatus 701, the image composition unit 714 chromakey-composites the received CG image with the captured image stored in the frame buffer 707 based on the specific color. The captured image to be associated with the CG image is the image used to acquire the position and orientation information used for generation of the CG image. For image composition using an $\alpha$ channel (semitransparent image composition), the image processing apparatus 703 transmits an $\alpha$ channel that is two-dimensional data of $\alpha$ values (mat values) of the pixels together with the CG image. The display unit 709 displays the obtained composite image, that is, MR image to produce mixed reality for the user.

This arrangement obviates captured image transmission from the image display apparatus 701 to the wireless AP 702a. For this reason, if, for example, the resolution, tone expression, and frame rate of the captured image are the same as those of the CG image, the amount of data to be transmitted is almost ½ as compared to the general MR system arrangement described in the prior art. The actual data amount is larger than ½ because the chromakey color or $\alpha$ channel is transmitted together with the CG image.

The captured image to be employed in composition is the captured image used to calculate the position and orientation information measured for CG image generation. It is therefore possible to provide an MR image without any time lag between the captured image and the CG image and any sense of incongruity. In addition, when the image processing apparatus 703 generates the CG image after predicting the display position in accordance with the composition timing, the time lag between the CG image and the physical world can be reduced.

The above-described arrangement and processing obviate captured image transmission for MR image display and enable maintaining of the same display quality.

The display image switching processing of the image display apparatus 701 will be described next with reference to FIG. 8.

Figure 8:
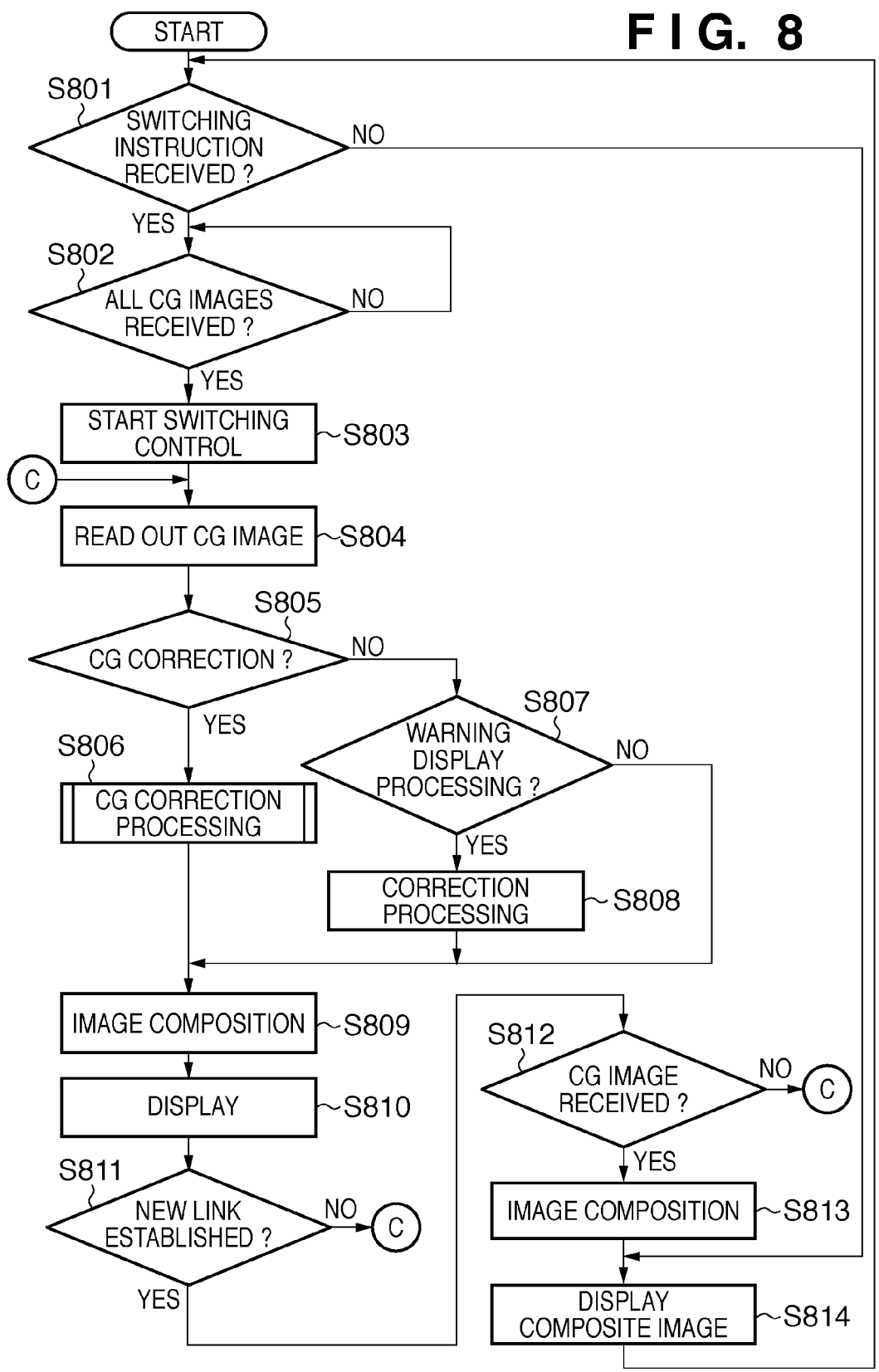
FIG. 8 is a flowchart illustrating the display image switching processing of the image display apparatus according to the third embodiment of the present invention.

FIG. 8 is a flowchart illustrating the display image switching processing of the image display apparatus according to the third embodiment of the present invention.

In step S801, the image display apparatus 701 determines whether a switching instruction determined by the image processing apparatus 703 is received via the wireless AP. If a switching instruction is received (YES in step S801), the process advances to step S802. If no switching instruction is received (NO in step S801), the process advances to step S814.

In step S802, the image display apparatus 701 determines whether all CG images corresponding to position and orientation information already transmitted until reception of the switching instruction are received. If all CG images are received (YES in step S802), the process advances to step S803. If a CG image is not received yet (NO in step S802), the process waits until all CG images are received.

When all CG images are received, the image display apparatus 701 starts switching control in step S803.

In step S804, the image display apparatus 701 reads out a CG image acquired immediately before the link disconnection and stored in the frame buffer 708.

In step S805, the image display apparatus 701 determines whether to execute CG image correction processing (CG correction processing). To execute CG correction processing (YES in step S805), the process advances to step S806. If CG correction processing is not to be executed (NO in step S805), the process advances to step S807.

In step S806, the image display apparatus 701 executes CG correction processing. Details of the correction processing will be described later with reference to a flowchart shown in FIG. 9. Processing then advances to step S809.

In step S807, the image display apparatus 701 determines whether to execute warning display processing of displaying a message to call the HMD user's attention. To execute warning display processing (YES in step S807), the process advances to step S808. If warning display processing is not to be executed (NO in step S807), the process advances to step S809.

In step S808, the image display apparatus 701 executes the warning display processing. This processing is the same as in step S609b in FIG. 6 of the second embodiment.

In step S809, the image display apparatus 701 composites the CG image with the captured image. In step S810, the image display apparatus 701 displays the generated composite image on the display unit 709 while updating until establishment of the link with the new wireless AP.

In step S811, the image display apparatus 701 determines whether the new link has been established. If the link has been established, and position and orientation information transmission has started (YES in step S811), the process advances to step S812. If the link has not been established yet, and handover is progressing (NO in step S811), the process returns to step S804.

In step S812, the image display apparatus 701 determines whether handover has finished, and a CG image corresponding to the position and orientation information transmitted to the wireless AP of the newly established link has been received. If a CG image has been received from the wireless AP of the newly established link (YES in step S812), the process advances to step S813. If no CG image has been received (NO in step S812), the process returns to step S804.

In step S813, the image display apparatus 701 composites the received CG image with the captured image. In step S814, the image display apparatus 701 displays the generated composite image on the display unit 709. Processing then returns to step S801.

The CG correction processing in step S806 according to the third embodiment of the present invention will be described next with reference to FIG. 9.

Figure 9:
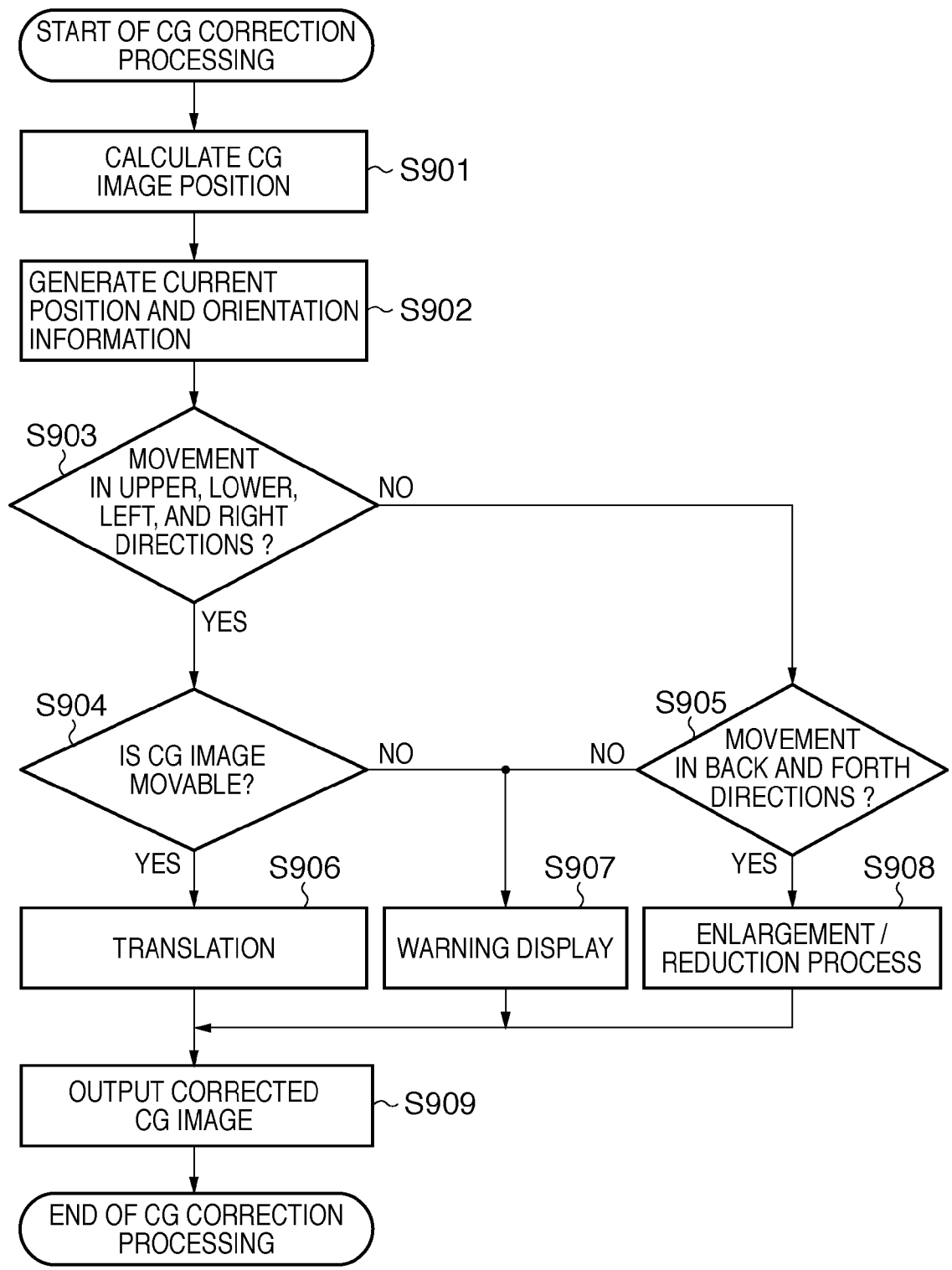
FIG. 9 is a flowchart illustrating details of CG correction processing in step S806 according to the third embodiment of the present invention.

FIG. 9 is a flowchart illustrating details of CG correction processing in step S806 according to the third embodiment of the present invention.

In step S901, the image display apparatus 701 calculates the position of a CG image acquired immediately before the link disconnection and stored in the frame buffer 708. In step S902, the image display apparatus 701 generates current position and orientation information based on sensor information from the three-dimensional position and orientation measurement sensor 705.

In step S903, the image display apparatus 701 grasps in which direction the HMD user is presently moving or directing the line-of-sight position and determines whether the movement direction is the left, right, upper, or lower direction. If it is a movement in the left, right, upper, or lower direction or a similar movement of the line-of-sight position (YES in step S903), the process advances to step S904. Otherwise (NO in step S903), the process advances to step S905.

In step S904, the image display apparatus 701 determines whether the CG image is movable. More specifically, the image display apparatus calculates the moving amount up to the current position and determines whether the display position of the CG image can be shifted in accordance with the moving amount without any inconvenience. The image display apparatus determines that the CG image is movable when an image except the acquired CG image can be displayed in the existing CG image display region or an image behind or on the left or right side of the obtained CG image is required as a result of a motion such as rotation. If the CG image is movable (YES in step S904), the process advances to step S906. If the CG image is not movable (NO in step S904), the process advances to step S907.

In step S905, the image display apparatus 701 determines whether the HMD user is moving back and forth. If the user is moving back and forth (YES in step S905), the process advances to step S908. If the user is not moving back and forth (NO in step S905), the process advances to step S907.

When movement in the upper, lower, left, and right directions is possible, the image display apparatus 701 translates the CG image in step S906. Processing then advances to step S909.

When the CG image is not movable, the image display apparatus 701 displays a warning message on the display unit 709 in step S907. Processing then advances to step S909.

When movement in the back and forth directions is possible, the image display apparatus 701 enlarges or reduces the CG image in step S908. Particularly, in moving toward the CG image rendering position, an enlargement process is executed. In moving away from the CG image, a reduction process is executed. If motions in the upper, lower, left, and right directions and movements in the back and forth directions are combined, appropriate processes are executed, although they will not be explained here. Processing then advances to step S909.

In step S909, the image display apparatus 701 outputs the CG image with the corrected position. Processing then returns to step S809 of FIG. 8.

As described above, according to the third embodiment, even when the image display apparatus composites a captured image and a CG image, it is possible to composite the captured image acquired in real time with the CG image according to the position and orientation of that time and display the composite image unless the movement is large. If CG image correction is impossible, the captured image may be displayed, as in the first embodiment. Alternatively, a warning message may be presented to the user, as in the second embodiment.

Note that the present invention can be applied to an apparatus comprising a single device or to a system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

In this case, so long as the system or apparatus has the functions of the program, the program may be executed in any form, such as object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-279383 filed on Oct. 26, 2007, which is hereby incorporated by reference herein in its entirety.

What is claimed is:

1. An image display system comprising:
an image display apparatus including an image capturing unit which captures an image of physical space in real time, a wireless communication unit which communicates with an image processing apparatus, including transmission of the captured image obtained by the image capturing unit to the image processing apparatus, and a display unit which receives from the image processing apparatus a composite image of the captured image and a virtual image composited by the image processing apparatus and displays the composite image;
the image processing apparatus which communicates with the image display apparatus, the image processing apparatus including a generation unit which generates position and orientation information of the image display apparatus, a virtual image generation unit which generates the virtual image based on the position and orientation information, a composition unit which composites the captured image and the virtual image, and a communication unit which communicates with the image display apparatus, including transmission of the composite image obtained by the composition unit to the image display apparatus; and
a plurality of wireless access points for communication between the image display apparatus and the image processing apparatus,
wherein the image processing apparatus further comprises:
a determination unit configured to determine whether switching from a first wireless access point used for communication with the image display apparatus to a second wireless access point is necessary; and
a switching instruction unit configured to transmit a switching instruction to the first wireless access point and the second wireless access point if the determination unit determines that the switching is necessary, and
wherein the image display apparatus further comprises:
a communication control unit configured to disconnect communication with the first wireless access point when the image display apparatus receives the communication switching instruction from the first wireless access point and to transmit a link request to establish communication with the second wireless access point of a new communication destination included in the switching instruction to the second wireless access point; and
a display control unit configured to display the captured image acquired in real time by the image capturing unit on the display unit instead of the composite image while a user of the image display apparatus is moving until the image display apparatus finishes switching from the first wireless access point to the second wireless access point,
wherein the display control unit, when the switching has finished and a composite image corresponding to the captured image transmitted to the second wireless access point of the new communication destination has been received, ends display control of an image which is currently displayed on the display unit, and displays the received composite image on the display unit.

2. An image display system comprising:
an image display apparatus including an image capturing unit which captures an image of physical space in real time, a wireless communication unit which communicates with an image processing apparatus, including transmission of the captured image obtained by the image capturing unit to the image processing apparatus, a display unit which receives from the image processing apparatus a composite image of the captured image and a virtual image composited by the image processing apparatus and displays the composite image, and an image superimposition display unit which superimposes a message image on a display image of the display unit;

the image processing apparatus which communicates with the image display apparatus, the image processing apparatus including a generation unit which generates position and orientation information of the image display apparatus, a virtual image generation unit which generates the virtual image based on the position and orientation information, a composition unit which composites the captured image and the virtual image, and a communication unit which communicates with the image display apparatus, including transmission of the composite image obtained by the composition unit to the image display apparatus; and a plurality of wireless access points for communication between the image display apparatus and the image processing apparatus, wherein the image processing apparatus further comprises:

a determination unit configured to determine whether switching from a first wireless access point used for communication with the image display apparatus to a second wireless access point is necessary; and a switching instruction unit configured to transmit a switching instruction to the first wireless access point and the second wireless access point if the determination unit determines that the switching is necessary, and wherein the image display apparatus further comprises:

a communication control unit configured to disconnect communication with the first wireless access point and transmit a link request to establish communication with the second wireless access point of a new communication destination included in the switching instruction to the second wireless access point when the image display apparatus receives the communication switching instruction from the first wireless access point; and a display control unit configured to superimpose the message image on the display image of the display unit so as to call a user's attention while the user of the image display apparatus is moving until the image display apparatus finishes switching from the first wireless access point to the second wireless access point, wherein the display control unit, when the switching has finished and a composite image corresponding to the captured image transmitted to the second wireless access point of the new communication destination has been received, ends display control of an image which is currently displayed on the display unit, and displays the received composite image on the display unit.

3. The image display system according to claim 2, wherein one of the image display apparatus and the image processing apparatus further comprises an input unit configured to instruct switching selection of superimposition of the message image.

4. An image display system comprising:

an image display apparatus including an image capturing unit which captures an image of physical space in real time, a storage unit which stores a virtual image, a composition unit which composites the captured image captured by the image capturing unit and the virtual image stored in the storage unit, a display unit which displays a composite image composited by the composition unit, and a wireless communication unit which communicates with an image processing apparatus, including reception of the virtual image from the image processing apparatus;

the image processing apparatus which communicates with the image display apparatus, the image processing apparatus including a virtual image generation unit which generates the virtual image based on position and orientation information of the image display apparatus, and a communication unit which communicates with the image display apparatus, including transmission of the virtual image to the image display apparatus; and a plurality of wireless access points for communication between the image display apparatus and the image processing apparatus, wherein the image processing apparatus further comprises:

a determination unit configured to determine whether switching from a first wireless access point used for communication with the image display apparatus to a second wireless access point is necessary; and a switching instruction unit configured to transmit a switching instruction to the first wireless access point and the second wireless access point if the determination unit determines that the switching is necessary, and wherein the image display apparatus further comprises:

a communication control unit configured to disconnect communication with the first wireless access point and transmit a link request to establish communication with the second wireless access point of a new communication destination included in the switching instruction to the second wireless access point when the image display apparatus receives the communication switching instruction from the first wireless access point; and a display control unit configured to display the composite image composited by the composition unit using the captured image and the virtual image stored in the storage unit on the display unit while a user of the image display apparatus is moving until the image display apparatus finishes switching from the first wireless access point to the second wireless access point, wherein the display control unit, when the switching has finished and a virtual image corresponding to the position and orientation information transmitted to the second wireless access point of the new communication destination has been received, ends display control of an image which is currently displayed on the display unit, and displays a composite image composited by the composition unit using the captured image and the received virtual image.

5. The image display system according to claim 4, wherein the image display apparatus further comprises an image superimposition display unit configured to superimpose a message image on a display image of the display unit, and wherein the display control unit causes the image superimposition display unit to superimpose the message image on the display image of the display unit.

6. The image display system according to claim 5, wherein one of the image display apparatus and the image processing apparatus further comprises an input unit configured to instruct switching selection of superimposition of the message image.

7. The image display system according to claim 4, wherein correction processing of the virtual image stored in the storage unit is executed based on the position and orientation information of the image display apparatus upon composition by the composition unit.

8. The image display system according to claim 7, wherein the correction processing is processing of translating a position of the virtual image.

9. The image display system according to claim 7, wherein the correction processing is one of an enlargement process and a reduction process of the virtual image.

10. The image display system according to claim 4, wherein the composition unit executes one of image composition by chromakey processing and semitransparent image composition using an α channel.

11. An image display apparatus including an image capturing unit which captures an image of physical space in real time, and a display unit which receives, from an image processing apparatus, a composite image of a virtual image and the captured image captured by the image capturing unit, which is composited by the image processing apparatus, and displays the composite image, the image display apparatus comprising:
- a wireless communication unit that communicates with the image processing apparatus via one of a plurality of wireless access points;
- a communication control unit configured to disconnect communication with a first wireless access point used for communication with the image processing apparatus when the image display apparatus receives a communication switching instruction from the first wireless access point and to transmit a link request to establish communication with a second wireless access point of a new communication destination included in the switching instruction to the second wireless access point; and
- a display control unit configured to display the captured image acquired in real time by the image capturing unit on the display unit instead of the composite image while a user of the image display apparatus is moving until the image display apparatus finishes switching from the first wireless access point to the second wireless access point,
- wherein the display control unit, when the switching has finished and a composite image corresponding to the captured image transmitted to the second wireless access point of the new communication destination has been received, ends display control of an image which is currently displayed on the display unit, and displays the received composite image on the display unit.

12. An image display apparatus including an image capturing unit which captures an image of physical space in real time, a display unit which receives from an image processing apparatus a composite image of a virtual image and the captured image captured by the image capturing unit, which is composited by the image processing apparatus, and displays the composite image, and an image superimposition display unit which superimposes a message image on a display image of the display unit, the image display apparatus comprising:
- a wireless communication unit that communicates with the image processing apparatus via one of a plurality of wireless access points;
- a communication control unit configured to disconnect communication with a first wireless access point used for communication with the image processing apparatus and transmit a link request to establish communication with a second wireless access point of a new communication destination included in a switching instruction to the second wireless access point when the image display apparatus receives a communication switching instruction from the first wireless access point; and
- a display control unit configured to superimpose the message image on the display image of the display unit so as to call a user's attention while the user of the image display apparatus is moving until the image display apparatus finishes switching from the first wireless access point to the second wireless access point,
- wherein the display control unit, when the switching has finished and a composite image corresponding to the captured image transmitted to the second wireless access point of the new communication destination has been received, ends display control of an image which is currently displayed on the display unit, and displays the received composite image on the display unit.

13. An image display apparatus including an image capturing unit which captures an image of physical space in real time, a storage unit which stores a virtual image, a composition unit which composites the captured image captured by the image capturing unit and the virtual image stored in the storage unit, and a display unit which displays a composite image composited by the composition unit, the image display apparatus comprising:
- a wireless communication unit that communicates with an image processing apparatus via one of a plurality of wireless access points;
- a communication control unit configured to disconnect communication with a first wireless access point used for communication with the image processing apparatus and transmit a link request to establish communication with a second wireless access point of a new communication destination included in a switching instruction to the second wireless access point when the image display apparatus receives a communication switching instruction from the first wireless access point; and
- a display control unit configured to display the composite image composited by the composition unit while a user of the image display apparatus is moving on the display unit until the image display apparatus finishes switching from the first wireless access point to the second wireless access point,
- wherein the display control unit, when the switching has finished and a virtual image corresponding to position and orientation information transmitted to the second wireless access point of the new communication destination has been received, ends display control of an image which is currently displayed on the display unit, and displays a composite image composited by the composition unit using the captured image and the received virtual image.

14. A method of controlling an image display apparatus including an image capturing unit which captures an image of physical space in real time, a display unit which receives from an image processing apparatus a composite image of a virtual image and the captured image captured by the image capturing unit, that is composited by the image processing apparatus and displays the composite image, and a wireless communication unit which communicates with the image processing apparatus via one of a plurality of wireless access points, the method comprising:
- upon receiving a communication switching instruction from a first wireless access point used for communication with the image processing apparatus, disconnecting communication with the first wireless access point when the image display apparatus receives the communication switching instruction from the first wireless access point and transmitting a link request to establish communication with a second wireless access point of a new communication destination included in the switching instruction to the second wireless access point; and
- displaying the captured image acquired in real time by the image capturing unit on the display unit instead of the composite image while a user of the image display apparatus is moving until the image display apparatus finishes switching from the first wireless access point to the second wireless access point, wherein when the switching has finished and a composite image corresponding to the captured image transmitted to the second wireless access point of the new communication destination has been received, display control of an image which is currently displayed on the display unit is ended, and the received composite image is displayed on the display unit.

15. A method of controlling an image display apparatus including an image capturing unit which captures an image of physical space in real time, a display unit which receives from an image processing apparatus a composite image of a virtual image and the captured image captured by the image capturing unit, that is composited by the image processing apparatus and displays the composite image, an image superimposition display unit which superimposes a message image on a display image of the display unit, and a wireless communication unit which communicates with the image processing apparatus via one of a plurality of wireless access points, the method comprising:

upon receiving a communication switching instruction from a first wireless access point used for communication with the image processing apparatus, disconnecting communication with the first wireless access point and transmitting a link request to establish communication with a second wireless access point of a new communication destination included in the switching instruction to the second wireless access point when the image display apparatus receives the communication switching instruction from the first wireless access point; and superimposing the message image on the display image of the display unit so as to call a user's attention while the user of the image display apparatus is moving until the image display apparatus finishes switching from the first wireless access point to the second wireless access point, wherein when the switching has finished and a composite image corresponding to the captured image transmitted to the second wireless access point of the new communication destination has been received, display control of an image which is currently displayed on the display unit is ended, and the received composite image is displayed on the display unit.

16. A method of controlling an image display apparatus including an image capturing unit which captures an image of physical space in real time, a storage unit which stores a virtual image, a composition unit which composites the captured image captured by the image capturing unit and the virtual image stored in the storage unit, a display unit which displays a composite image composited by the composition unit, and a wireless communication unit which communicates with an image processing apparatus via one of a plurality of wireless access points, the method comprising:

upon receiving a communication switching instruction from a first wireless access point used for communication with the image processing apparatus, disconnecting communication with the first wireless access point and transmitting a link request to establish communication with a second wireless access point of a new communication destination included in the switching instruction to the second wireless access point when the image display apparatus receives the communication switching instruction from the first wireless access point; and displaying the composite image composited by the composition unit on the display unit while a user of the image display apparatus is moving until the image display apparatus finishes switching from the first wireless access point to the second wireless access point, wherein when the switching has finished and a virtual image corresponding to position and orientation information transmitted to the second wireless access point of the new communication destination has been received, display control of an image which is currently displayed on the display unit is ended, and a composite image composited by the composition unit is displayed using the captured image and the received virtual image.

17. A non-transitory computer-readable medium having stored thereon a computer program to cause a computer to execute control of an image display apparatus including an image capturing unit which captures an image of physical space in real time, a display unit which receives from an image processing apparatus a composite image of a virtual image and the captured image captured by the image capturing unit, which is composited by the image processing apparatus, and displays the composite image, and a wireless communication unit which communicates with the image processing apparatus via one of a plurality of wireless access points, by causing the computer to execute:

a communication control step of, upon receiving a communication switching instruction from a first wireless access point used for communication with the image processing apparatus, disconnecting communication with the first wireless access point when the image display apparatus receives the communication switching instruction from the first wireless access point and transmitting a link request to establish communication with a second wireless access point of a new communication destination included in the switching instruction to the second wireless access point; and a display control step of displaying the captured image acquired in real time by the image capturing unit on the display unit instead of the composite image while a user of the image display apparatus is moving until the image display apparatus finishes switching from the first wireless access point to the second wireless access point, wherein when the switching has finished and a composite image corresponding to the captured image transmitted to the second wireless access point of the new communication destination has been received, display control of an image which is currently displayed on the display unit is ended, and the received composite image is displayed on the display unit.

18. A non-transitory computer-readable medium having stored thereon a computer program to cause a computer to execute control of an image display apparatus including an image capturing unit which captures an image of physical space in real time, a display unit which receives from an image processing apparatus a composite image of a virtual image and the captured image captured by the image capturing unit, that is composited by the image processing apparatus, and displays the composite image, an image superimposition display unit which superimposes a message image on a display image of the display unit, and a wireless communication unit which communicates with the image processing apparatus via one of a plurality of wireless access points, by causing the computer to execute:

a communication control step of, upon receiving a communication switching instruction from a first wireless access point used for communication with the image processing apparatus, disconnecting communication with the first wireless access point and transmitting a link request to establish communication with a second wireless access point of a new communication destination included in the communication switching instruction to the second wireless access point when the image display apparatus receives the communication switching instruction from the first wireless access point; and a display control step of superimposing the message image on the display image of the display unit so as to call a user's attention while the user of the image display apparatus is moving until the image display apparatus finishes switching from the first wireless access point to the second wireless access point, wherein when the switching has finished and a composite image corresponding to the captured image transmitted to the second wireless access point of the new communication destination has been received, display control of an image which is currently displayed on the display unit is ended, and the received composite image is displayed on the display unit.

19. A non-transitory computer-readable medium having stored thereon a computer program to cause a computer to execute control of an image display apparatus including an image capturing unit which captures an image of physical space in real time, a storage unit which stores a virtual image, a composition unit which composites the captured image captured by the image capturing unit and the virtual image stored in the storage unit, a display unit which displays a composite image composited by the composition unit, and a wireless communication unit which communicates with an image processing apparatus via one of a plurality of wireless access points, by causing the computer to execute:

a communication control step of, upon receiving a communication switching instruction from a first wireless access point used for communication with the image processing apparatus, disconnecting communication with the first wireless access point and transmitting a link request to establish communication with a second wireless access point of a new communication destination included in the communication switching instruction to the second wireless access point when the image display apparatus receives the communication switching instruction from the first wireless access point; and a display control step of displaying the composite image composited by the composition unit on the display unit while a user of the image display apparatus is moving until the image display apparatus finishes switching from the first wireless access point to the second wireless access point, wherein when the switching has finished and a virtual image corresponding to position and orientation information transmitted to the second wireless access point of the new communication destination has been received, display control of an image which is currently displayed on the display unit is ended, and a composite image composited by the composition unit is displayed using the captured image and the received virtual image.

20. An image display system comprising:

an image display apparatus including an image capturing unit which captures an image of physical space in real time, a communication unit which communicates with an image processing apparatus and a display unit which receives from the image processing apparatus a composite image and displays the composite image;

the image processing apparatus including a composition unit which composites the captured image and a virtual image as the composite image, and a communication unit which communicates with the image display apparatus; and a plurality of wireless access points for communication between the image display apparatus and the image processing apparatus, wherein the image processing apparatus further comprises:

a determination unit configured to determine whether or not switching from a first wireless access point used for communication with the image display apparatus to a second wireless access point is necessary; and a switching instruction unit configured to transmit a switching instruction to the first wireless access point and the second wireless access point if the determination unit determines that the switching is necessary, and wherein the image display apparatus further comprises:

a display control unit configured to display the captured image on the display unit instead of the composite image while a user of the image display apparatus is moving until the image display apparatus finishes switching from the first wireless access point to the second wireless access point, wherein the display control unit, when the switching has finished and a composite image corresponding to the captured image transmitted to the second wireless access point has been received, ends display control of an image which is currently displayed on the display unit, and displays the received composite image on the display unit.

21. An image display apparatus comprising:

an image capturing unit configured to capture an image of physical space in real time;

a communication unit configured to communicate with an image processing apparatus via one of a plurality of wireless access points; and a display unit configured to display the captured image on the display unit instead of a composite image which is composited with the captured image and a virtual image while a user of the image display apparatus is moving until the image display apparatus finishes switching from a first wireless access point to a second wireless access point, wherein the display unit, when the switching has finished and a composite image corresponding to the captured image transmitted to the second wireless access point has been received, ends display control of an image which is currently displayed on the display unit, and displays the received composite image on the display unit.

22. An image display apparatus comprising:

a communication unit configured to communicate with an image processing apparatus via one of a plurality of wireless access points;

an obtaining unit configured to obtain a virtual image from the image processing apparatus; and a display unit configured to display the virtual image obtained by the obtaining unit, wherein the display unit does not display the virtual image while a user of the image display apparatus is moving until the image display apparatus finishes switching from a first wireless access point to a second wireless access point, and wherein a display control unit, when the switching has finished and the virtual image has been obtained from the image processing apparatus via the second wireless access point, ends display control of an image which is currently displayed on the display unit, and displays the obtained virtual image on the display unit.

* * * * *